(12) United States Patent
Nakagawa et al.

(10) Patent No.: US 7,946,404 B2
(45) Date of Patent: May 24, 2011

(54) WORK VEHICLE CONTROLLER

(75) Inventors: Tomohiro Nakagawa, Hirakata (JP); Shigeru Yamamoto, Hirakata (JP); Mitsuhiko Kamado, Hirakata (JP)

(73) Assignee: Komatsu Ltd., Tokyo (JP)

( * ) Notice: Subject to any disclaimer, the term of this patent is extended or adjusted under 35 U.S.C. 154(b) by 447 days.

(21) Appl. No.: 12/086,706

(22) PCT Filed: Nov. 30, 2006

(86) PCT No.: PCT/JP2006/323957
§ 371 (c)(1),
(2), (4) Date: Jun. 18, 2008

(87) PCT Pub. No.: WO2007/072667
PCT Pub. Date: Jun. 28, 2007

(65) Prior Publication Data
US 2009/0013810 A1    Jan. 15, 2009

(30) Foreign Application Priority Data

Dec. 22, 2005  (JP) ................................ 2005-370222

(51) Int. Cl.
*B60W 10/10* (2006.01)
*B60W 10/18* (2006.01)
*B60W 30/18* (2006.01)

(52) U.S. Cl. ........................................ 192/219; 192/221
(58) Field of Classification Search .................... 192/219
See application file for complete search history.

(56) References Cited

U.S. PATENT DOCUMENTS

| 3,913,700 | A | * | 10/1975 | James | ........................... 180/271 |
| 4,768,636 | A |   | 9/1988  | Ito et al. | |
| 5,568,851 | A |   | 10/1996 | Maes | |
| 5,588,515 | A |   | 12/1996 | Toyama et al. | |
| 6,644,454 | B2 | * | 11/2003 | Yamada et al. | ............. 192/219.1 |
| 2004/0180753 | A1 | * | 9/2004 | Takamura et al. | ............... 477/94 |
| 2005/0227810 | A1 | * | 10/2005 | Nakagawa et al. | ........... 477/172 |

FOREIGN PATENT DOCUMENTS

| JP | 61-55413 | 3/1986 |
| JP | 62-026133 | 2/1987 |
| JP | 3-128730 | 5/1991 |
| JP | 6-92162 | 4/1994 |
| JP | 6-272758 | 9/1994 |
| JP | 2680479 | 11/1997 |

OTHER PUBLICATIONS

International Search Report issued Jan. 9, 2007 in the International (PCT) Application of which the present application is the U.S. National Stage.

* cited by examiner

*Primary Examiner* — Richard M. Lorence
(74) *Attorney, Agent, or Firm* — Wenderoth, Lind & Ponack L.L.P.

(57) ABSTRACT

A device for a work vehicle eliminates uncomfortable operation feeling, improves the working efficiency, and reduces thermal load on a clutch and transmission shock. It is determined whether the current travel direction of the vehicle body is a forward travel direction F or a reverse travel direction R based clutch oil pressure of the forward clutch or reverse clutch. Braking force of a brake device is controlled such that the brake device is activated on the conditions that the travel direction position selected by the travel operation lever and the travel direction determined by a travel direction flag are opposite to each other, and the detected vehicle body speed is equal to or greater than a predetermined threshold value.

4 Claims, 9 Drawing Sheets

WORK VEHICLE CONTROLLER

TECHNICAL FIELD

The present invention relates to a controller suitable for mounting on a work vehicle such as a bulldozer.

BACKGROUND ART

In a work vehicle such as a bulldozer, engine output is transmitted to a drive wheel (sprocket) via a transmission (hydraulic clutch). The transmission is comprised of a forward travel gear selected by connection of a forward clutch, a reverse travel gear selected by connection of a reverse clutch, and speed gears selected by switching connection of speed-change clutches.

In a work vehicle, a forward operation command is output when an operator operates a travel operation device such as an operation lever to a forward travel direction position ("F" position). When the forward operation command is output, the forward clutch is connected, and engine power is transmitted to the drive wheel via the forward travel gear and a currently selected speed gear of the transmission. This causes the vehicle to travel forward. When the operator operates the travel operation device to a reverse travel direction position ("R" position), a reverse operation command is output. When the reverse operation command is output, the reverse clutch is connected, and engine power is transmitted to the drive wheel via the reverse travel gear and a currently selected speed gear of the transmission. This causes the vehicle to travel in reverse.

When the forward motion of the work vehicle is switched to the reverse motion or vice versa, it is generally preferable for protection of the clutch to halt the work vehicle before operating the travel operation device to switch between forward and reverse operation.

However, it is very much a situation in which the travel operation device is, for example, operated to start reverse motion while the vehicle is still traveling forward, for the purpose of shortening the cycle time.

When the operator operates the travel operation device and a reverse operation command is output while the work vehicle is traveling forward, the reverse clutch is connected gradually. This causes the vehicle's kinetic energy to be absorbed by the reverse clutch, and the vehicle is decelerated.

When the vehicle, which is traveling forward, is decelerated by the connection operation of the reverse clutch, problems as follows will be incurred.

(A) When the reverse clutch is set to the slip state, such power as to cause the vehicle to travel in reverse is momentarily transmitted from the transmission to the drive wheel. This produces a transmission shock.

(B) The reverse clutch is subjected to a significant thermal load in order to decelerate the vehicle. This reduces the lifetime of the reverse clutch. It is conceivable that the reverse clutch connection operation is performed in a short period of time in order to reduce the thermal load applied to the reverse clutch. In this case, however, the vehicle will be decelerated abruptly, causing significant transmission shock.

(C) The reverse clutch connection operation is in need of being performed in a short period of time when the vehicle is caused to travel in reverse after deceleration operation in order to prevent the reverse clutch which has been subjected to a substantial thermal load from being subjected to more thermal load. Such connection operation will also cause a transmission shock.

Similar problems will also occur when the vehicle which is traveling in reverse is switched to the forward travel.

(Related Art 1)

Patent Document 1 describes an invention in which when an operation lever is switched from the forward travel direction position to the reverse travel direction position, both a forward clutch and a reverse clutch are set to the disconnected state while a speed-change clutch is connected appropriately, so that the vehicle's kinetic energy is absorbed by the speed-change clutch to decelerate the vehicle. The same applies to when switching from the reverse travel direction position to the forward travel direction position.

(Related Art 2)

Patent Document 2 describes an invention in which when an operation lever is operated to switch from the forward travel direction position to the reverse travel direction position, the clutch connection is switched from a forward clutch to a reverse clutch while automatically activating a brake if the vehicle speed is higher than a certain vehicle speed. The same applies to when switching from the reverse travel direction position to the forward travel direction position.

(Related Art 3)

Patent Document 3 describes an invention in which when an operation lever is operated to switch from the forward travel direction position to the reverse travel direction position, the clutch connection is switched from the forward clutch to the reverse clutch while activating a brake if the vehicle speed is higher than a certain vehicle speed, whereas if the vehicle speed is the certain vehicle speed or lower, the engagement force between the forward clutch and the reverse clutch is controlled. The same applies to when switching from the reverse travel direction position to the forward travel direction position.

(Related Art 4)

Patent Document 4 describes an invention in which when an operation lever is operated to switch from the forward travel direction position to the reverse travel direction position, the clutch connection is switched from the forward clutch to the reverse clutch while activating a brake so as to increase the braking force if the vehicle speed before the switching operation is high, whereas if the vehicle speed before the switching operation is low, the clutch connection is switched from the forward clutch to the reverse clutch while activating the brake so as to reduce the braking force. The same applies to when switching from the reverse travel direction position to the forward travel direction position.

[Patent Document 1] Japanese Patent Application Laid-Open No. 06-272758
[Patent Document 2] Japanese Patent Application Laid-Open No. 03-128730
[Patent Document 3] Japanese Patent Application Laid-Open No. 06-92162
[Patent Document 4] Japanese Patent No. 2680479

DISCLOSURE OF THE INVENTION

Problems to be Solved by the Invention

According to the invention described in Patent Document 1, both the forward clutch and the reverse clutch are set to the disconnected state while the speed-change clutch is connected appropriately so that the vehicle's kinetic energy is absorbed by the speed-change clutch when the clutch position is switched from the forward travel direction position to the reverse travel direction position. Therefore, the speed-change clutch is subjected to a significant thermal load during the deceleration of the vehicle. This causes a problem that the lifetime of the speed-change clutch is reduced.

The inventions described in Patent Documents 2, 3, and 4 are all designed such that the brake is activated whenever the operation lever is switch-operated. It's not that the final switching operation position is checked before activating the brake.

It is true that the activation of the brake reduces the relative rotational rate between the input side and the output side of the reverse clutch, reduces the frictional heat due to clutch slipping, and reduces the thermal load applied to the clutch if the operation lever is switch-operated to the "reverse travel direction position R" and the switched position is established while the vehicle is traveling forward. The same applies to when the lever is switch-operated to the forward travel direction position.

However, when the operation lever is switch-operated during traveling of a work vehicle such as a bulldozer, the switched position is not a position established finally.

Specifically, bulldozers often perform so-called "shuttle operation" for leveling the natural ground. The term "shuttle operation" means an operation in which the operation lever is switched to the forward travel direction position F or the reverse travel direction position R via the neutral position N at least twice or more in a short period of time. It should be understood that, besides the shuttle operation described above, the operation lever is sometimes switched to the forward travel direction position F or the reverse travel direction position R via the neutral position N at least twice or more in a short period of time, for example due to misjudgment or miscalculation of the operator.

A case is assumed, for example, in which the switching operation is performed in the sequence of "F→N→R→N→F" in a short period of time.

If the technologies described in Patent Documents 2, 3, and 4 are directly applied in this case, the brake is activated every time the switching operation is performed, resulting in continuous operation of the brake during the shuttle operation. The switching operation of "F→N→R→N→F" is an operation in which the lever is switched finally back to the forward travel direction position F during the forward traveling of the vehicle, and the operator's intention is "to drive the vehicle body to the same direction (forward direction) without activating the brake". If the brake is activated against this intention, the operator will be given an uncomfortable operation feeling. In addition, it will cause the vehicle to continue traveling forward while being braked, resulting in inefficiency.

It is also conceivable to perform control such that the brake activation is inhibited upon detecting that a shuttle operation (switching operation in a period of time) is performed. However, this may result in that the brake is not activated when it is required. It is assumed for example that the shuttle operation is performed in the sequence of "F→N→R→N→F→N→R" during forward traveling of the vehicle, and the operation lever is finally switched reversely to the reverse travel direction position R. The operator's intention in this case is to "switch from the forward travel to the reverse travel without causing transmission shock or too much thermal load on the clutch". However, since the brake is not activated, the transmission shock as well as the thermal load on the clutch will be increased against the operator's intention.

Another method is conceivable in which history of switching operation positions of the operation lever is stored in memory so that the brake is activated if the first operation position stored is opposite to the last operation position stored when comparing them with each other. In this case, however, the storing processing and the control become complicated.

The history of switching operation positions of the operation lever is not enough to understand the actual travel direction of the vehicle body, and hence this method lacks reliability. When traveling along a sloping road, for example, the vehicle body may actually be traveling in reverse even if the last operation position is the forward position.

The present invention has been made in view of these circumstances, and it is an object of the invention to solve the above-described problems by devising such that, even if an operation such as shuttle operation whose final operation position is uncertain is performed, the brake is prevented from unnecessary activation until the final operation position is established. After the establishment of the final operation position, the brake is activated only if the established final operation position is opposite to the actual travel direction, whereas the brake is not activated if the established operation position is the same as that before starting the operation. Thus, the uncomfortable operation feeling is eliminated, the working efficiency is improved, and the thermal load on the clutch and the transmission shock are reduced.

Means for Solving the Problems

A first aspect of the invention provides a work vehicle controller having a forward clutch terminating its clutch connection operation when its clutch oil pressure reaches a holding pressure, and a reverse clutch terminating its clutch connection operation when its clutch oil pressure reaches a holding pressure, and being designed such that an engine power is transmitted to a drive wheel via the forward clutch or the reverse clutch. The work vehicle controller comprises; operation means that is operated to select a travel direction position from among a forward travel direction position, a neutral position, and a reverse travel direction position; brake means that reduces a vehicle body speed; vehicle body speed detection means that detects the vehicle body speed; forward/reverse clutch control means that controls the clutch oil pressure to disconnect the reverse clutch while connecting the forward clutch when the forward travel direction position is selected by the operation means, and controls the clutch oil pressure to disconnect the forward clutch while connecting the reverse clutch when the reverse travel direction position is selected by the operation means; travel direction determination means that determines whether a current travel direction of a vehicle body is the forward travel direction or the reverse travel direction based on an operation position selected by the operation means, the clutch oil pressure of the forward clutch or the reverse clutch, and the detected vehicle body speed; and braking force control means that controls a braking force of the brake means such that the brake means is activated on conditions that the travel direction position selected by the operation means and the travel direction determined by the travel direction determination means are opposite to each other and the detected vehicle body speed is greater than a predetermined threshold value, when the operation position selected by the operation means is switched over.

A second aspect of the invention according to the first aspect is characterized in that: the braking force control means controls the braking force of the brake means such that: the brake means is activated on the conditions that the travel direction position selected by the operation means and the travel direction determined by the travel direction determination means are opposite to each other, and the detected vehicle body speed is greater than the predetermined threshold value, when the operation position selected by the operation means is switched over; and the brake means is deactivated on a condition that the detected vehicle body speed is equal to or smaller than the predetermined threshold value when the operation position selected by the operation means is switched over.

A third aspect of the invention provides a work vehicle controller having a forward clutch terminating its clutch connection operation when its clutch oil pressure reaches a holding pressure, and a reverse clutch terminating its clutch connection operation when its clutch oil pressure reaches a holding pressure, and being designed such that an engine power is transmitted to a drive wheel via the forward clutch or the reverse clutch. The work vehicle controller comprises: operation means that is operated to select a travel direction position from among a forward travel direction position, a neutral position, and a reverse travel direction position; brake means that reduces a vehicle body speed; vehicle body speed/travel direction detection means that detects the vehicle body speed and the travel direction; forward/reverse clutch control means that controls the clutch oil pressure to disconnect the reverse clutch while connecting the forward clutch when the forward travel direction position is selected by the operation means, and controls the clutch oil pressure to disconnect the forward clutch while connecting the reverse clutch when the reverse travel direction position is selected by the operation means; and braking force control means that controls a braking force of the brake means such that the brake means is activated on conditions that the travel direction position selected by the operation means and the travel direction detected by the vehicle body speed/travel direction detection means are opposite to each other and the detected vehicle body speed is greater than a predetermined threshold value.

A fourth aspect of the invention according to the third aspect is characterized in that: the braking force control means controls the braking force of the brake means such that: the brake means is activated on the conditions that the travel direction position selected by the operation means and the travel direction detected by the vehicle body speed/travel direction detection means are opposite to each other and the detected vehicle body speed is greater than the predetermined threshold value; and the brake means is deactivated on a condition that the detected vehicle body speed is equal to or smaller than the predetermined threshold value when the operation position selected by the operation means is switched over.

According to the first and second aspects of the invention, it is determined whether a current travel direction of the vehicle body is the forward travel direction F or the reverse travel direction R based on an operation position selected by the travel operation lever 36a, a clutch oil pressure of the forward clutch 17 or the reverse clutch, and a detected vehicle body speed (travel direction flag).

Then, the braking force of a brake device 8 is controlled such that the brake device 8 is activated on the conditions that a travel direction position selected by the travel operation lever 36a (R, for example) and a travel direction determined by the travel direction flag (F, for example) are opposite to each other and the detected vehicle body speed is greater than a predetermined threshold value (FR speed change flag is ON), when the operation position selected by the travel operation lever 36a is switched over (FR interlocking brake activation conditions (a) and (b)) (determined YES in step 106 and determined YES in either step 107 or 108 of FIG. 4; step 115).

Further, the braking force of a brake device 8 is controlled such that the brake device 8 is deactivated on the condition that the detected vehicle body speed is equal to or smaller than the predetermined threshold value when the operation position selected by the travel operation lever 36a is switched over (FR interlocking brake deactivation condition (c); zero cross flag is ON) (determined YES in step 104 of FIG. 4; step 125 and step 113).

This enables the control to prevent unnecessary activation of the brake until a final operation position is established even if performed is an operation whose final operation position is uncertain, such as a shuttle operation. Further, once the final operation position is established, the brake is controlled to be activated if the final operation position is opposite to an actual travel direction. If the final operation position is the same direction as the direction before starting the operation, the brake is controlled not to be activated. This eliminates uncomfortable operation feeling to the operator, and improves the working efficiency. Further, the thermal load on the clutch and the transmission shock can be reduced.

According to the third and fourth aspects of the invention, vehicle body speed/travel direction detection means is provided in place of the vehicle body travel direction determination means according to the first and second aspects of the invention, so that the vehicle body travel direction is directly detected.

As shown in FIG. 5, the brake force of the brake device 8 is controlled such that the brake device 8 is activated on the conditions that a travel direction position selected by the travel operation lever 36a (R, for example) and a detected travel direction (F, for example) are opposite to each other (determined YES in step 108), and a detected vehicle body speed is greater than a predetermined threshold value (determined NO in step 104) (step 115).

Further, the brake force of the brake device 8 is controlled such that the brake device 8 is deactivated on the condition that a detected vehicle body speed is equal to or smaller than the predetermined threshold value (determined YES in step 104, step 125; zero cross flag ON).

DETAILED DESCRIPTION OF THE INVENTION

Embodiments of a work vehicle controller according to the present invention will be described with reference to the drawings. The embodiments are based on the assumption that the present invention is applied to a bulldozer as a work vehicle.

Figure 1:
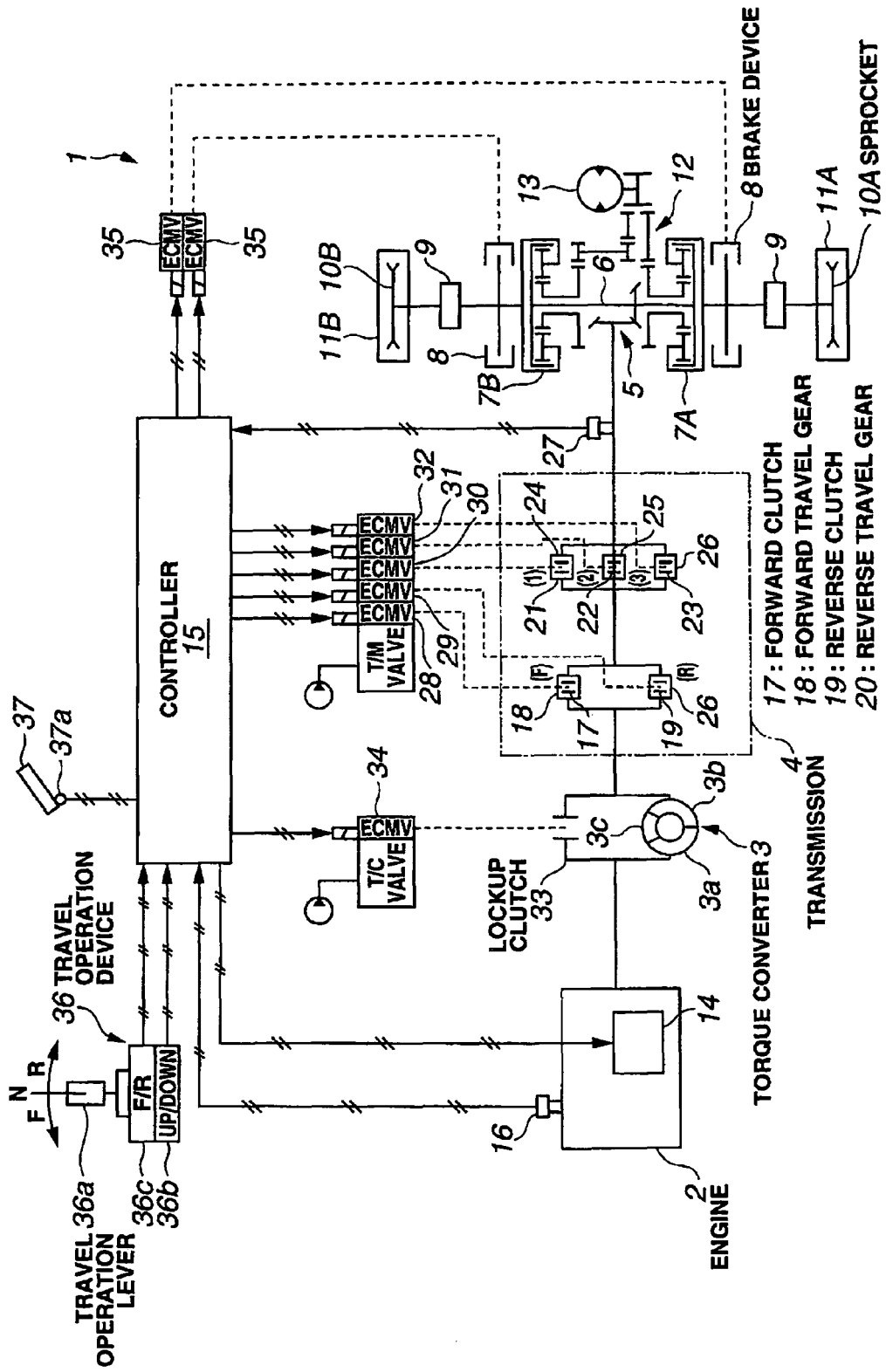
FIG. 1 is a configuration diagram of a bulldozer controller according to an embodiment.

FIG. 1 is a configuration diagram showing a bulldozer controller according to an embodiment.

A controller 1 shown in FIG. 1 is mounted on a bulldozer.

Rotational driving power of an engine 2 is transmitted to a torque converter 3. The rotational driving power is then transmitted from an output shaft of this torque converter 3 to a transmission 4, and then transmitted from an output shaft of the transmission 4 to a cross shaft 6 via a bevel gear 5.

A left side and right side planetary gear mechanisms 7A and 7B are linked to the cross shaft 6.

The output shaft fixed to a planet carrier of the left side planetary gear mechanism 7A is linked to a left side sprocket (left side drive wheel) 10A via a brake device 8 and a final reduction gear unit 9. The output shaft fixed to a planet carrier of the right side planetary gear mechanism 7B is linked to a right side sprocket (right side drive wheel) 10B via the brake device 8 and the final reduction gear unit 9. The lift-side and right side sprockets 10A and 10B are respectively engaged with crawler belts 11A and 11B arranged on the left and right sides of the vehicle body.

The rotational driving power transmitted from the cross shaft 6 to the ring gears in the left and right side planetary gear mechanisms 7A and 7B is transmitted to the sprockets 10A and 10B from the planet carriers of the left and right side planetary gear mechanisms 7A and 7B via the respective final reduction gear units 9, 9, and the crawler belts 11A and 11B are driven by the sprockets 10A and 10B.

A gear integrally fixed to the sun gear of the left side planetary gear mechanism 7A and a gear integrally fixed to the sun gear of the right side planetary gear mechanism 7B are engaged with a gear fixed to an output shaft of a hydraulic motor 13 by way of power transmission mechanisms 12 respectively formed by a gear train as required. The rotational driving power of the hydraulic motor 13 is transmitted from the sun gears in the left and right side planetary gear mechanisms 7A and 7B to the left and right side sprockets 10A and 10B via the planet carriers and final reduction gear units 9, 9. The vehicle can be turned left or right by differentiating the rotational rate between the left and right side sprockets 10A and 10B. This mechanism is called a hydrostatic steering system (HSS).

The engine 2 is a diesel engine. The engine 2 is provided with an accumulator (common rail) type fuel injection device 14. This fuel injection device 14 itself is well known. Specifically, the accumulator (common rail) type fuel injection device 14 is designed such that fuel is accumulated in a common rail chamber by a fuel-pumping pump and injected from an injector by opening/closing of an electromagnetic valve. Fuel injection characteristics are determined by a drive signal from a controller 15 to the electromagnetic valve, and thus desired injection characteristics can be obtained from a low speed range to a high speed range of the engine 2.

According to this embodiment, an electronically controlled injection system is built up by the fuel injection device 14, the controller 15 and various sensors and other equipment. This type of electronically controlled injection system is designed such that target injection characteristics are stored by mapping digital values to obtain desirable engine characteristics. The actual rotational speed of the engine 2 is detected by a rotational speed sensor 16 and a detection signal obtained thereby is input to the controller 15.

The transmission 4 is comprised of a forward travel gear 18 selected by connection of a forward clutch 17, a reverse travel gear 20 selected by connection of a reverse clutch 19, and first to third speed gears 24 to 26 respectively selected by speed-change clutches 21 to 23.

The forward clutch 17, the reverse clutch 19, and the speed-change clutches 21 to 23 are each formed as a hydraulic actuated friction clutch (hydraulic clutch). The forward travel gear 18, the reverse travel gear 20, and the first to third speed gears 24 to 26 are each formed by a planetary gear train (or parallel axis gear train).

A rotational speed sensor 27 is attached to the output shaft of the transmission 4. The rotational speed sensor 27 is a sensor for detecting the rotational speed of the output shaft of the transmission 4. A detection signal from the rotational speed sensor 27 is input to the controller 15. The controller 15 converts the input actual rotational rate of the output shaft of the transmission 4 into a vehicle body speed. The rotational speed sensor 27 is formed by an electromagnetic pickup, for example.

The transmission 4 has an ECMV (electronic controlled modulation valve) 28 attached thereto for controlling the connection/disconnection operation of the forward clutch 17.

The ECMV 28 is formed by a combination of an electromagnetic proportional pressure control valve which converts electric current fed from the controller 15 into a thrust proportional to the current by means of a proportional solenoid and adjusts the clutch oil pressure to balance the oil pressure with the thrust, and a flow rate detection valve. The flow rate detection valve detects the flow rate of pressure oil flowing into the clutch and, if the flow rate is equal to or higher than a predetermined value, introduces the pressure oil discharged from the hydraulic pump directly into the clutch, and the flow rate detection valve closes when the flow rate becomes lower than the predetermined value (when the filling time ends; the build up waiting time limit has elapsed).

The ECMV 28 changes the oil pressure applied to the forward clutch 17 connected to the ECMV 28 according to a current command signal supplied from the controller 15. The forward clutch 17 changes its degree of engagement according to the change in the oil pressure from the ECMV 28. It should be noted that if pressure oil is supplied rapidly from the ECMV 28 to connect the clutch rapidly during connection operation of the forward clutch 17, problems will occur such as sudden start shock and engine stall caused by load applied rapidly to the engine. Therefore, the ECMV 28 operates to connect the forward clutch 17 rather slowly by means of the current command signal supplied from the controller 15.

Figure 2:
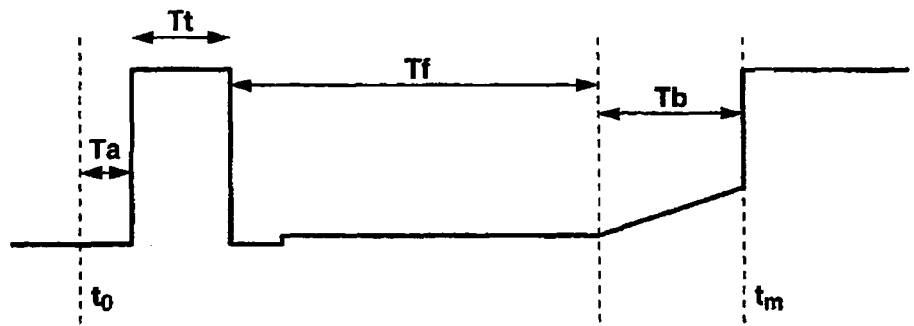
FIG. 2 is a diagram for explaining operation of an ECMV.

Such operation of the ECMV 28 will be described based on the current command signal of the controller 15 (see FIG. 2). Upon receiving trigger current (Tt in FIG. 2) as a connection command from the controller 15, the ECMV 28 starts supplying hydraulic oil to the forward clutch 17. The ECMV 28 opens the flow rate detection valve to supply rapidly the hydraulic oil to the forward clutch 17 as long as there is flow of hydraulic oil to the forward clutch 17. When a predetermined time, or filling time (build up waiting time limit denoted by Tf in FIG. 2) has elapsed and the inside of the forward clutch 17 is filled with the hydraulic oil, the ECMV 28 closes the flow rate detection valve so that the oil pressure acting on the forward clutch 17 can be changed by the electromagnetic proportional pressure control valve according to the command current from the controller 15. In order to connect the forward clutch 17, the current command signal is gradually increased (built up) (Tb in FIG. 2). After building up for a predetermined time, the current command value is set to such a value as the clutch oil pressure reaches a holding pressure (tm in FIG. 2), whereby the connection operation at the input and output sides of the forward clutch 17 is completed. In order to disconnect the forward clutch 17, the current command signal given from the controller 15 to the ECMV 28 is set to zero, whereby the ECMV 28 is caused to operate to discharge the pressure oil from the forward clutch 17. This disconnects the forward clutch 17 at the input and output sides.

It should be understood that it is optional to give an appropriate current command signal for making the operation of the ECMV 28 reliable within the filling time (see the change in the signal level during the interval of Tf in FIG. 2), and to provide dead time before starting the operation described above (Ti in FIG. 2), and the amount of increasing the signal level and the time Tb for the build up can be set arbitrarily. This means that the current command signal for connection of the forward clutch 17 shown in FIG. 2 is only an example, and the objects and effects of the present invention can also be attained by using other current command signals instead.

Further, according to this exemplary embodiment as described later, an ECMV is employed also in hydraulic circuits relating to a speed gear clutch, a lockup clutch, and a brake. For the ECMV employed for this purpose, a current command signal suitable for operation of each component may be used. In a brake circuit to be described later, in particular, the ECMV is operated without providing a current command signal such as trigger current. The objects and effects of the present invention can also be attained without using the ECMV 28 while replacing the same with control by other hydraulic circuit configurations or other controllers.

The transmission 4 is provided with the reverse clutch 19 and the speed-change clutches 21 to 23 in addition to the forward clutch 17, and these clutches have ECMVs 29 to 32 attached thereto, respectively. The clutches 19, and 21 to 23 operate in a similar manner to the forward clutch 17 described above.

The torque converter 3 is provided with a lockup clutch 33. The lockup clutch 33 is fixedly linked with a pump (input element) 3a and a turbine (output element) 3b when characteristics as a torque converter are not required.

When command current is input from the controller 15 to an ECMV 34, the ECMV 34 changes the oil pressure applied to the lockup clutch 33 according to the command current to control connection and disconnection of the lockup clutch 33.

When the lockup clutch 33 is placed in the disconnected state by the ECMV 34, mechanical power of the engine 2 is once converted into dynamic energy of fluid by the torque converter 3, and then again converted into mechanical power before being input to the transmission 4. Accordingly, vibrations and shocks occurring in the engine 2 or in the power transmission path downstream of the transmission 4 can be reduced by a damper effect provided by the torque converter 3. When the lockup clutch 33 is placed in the connected state by the ECMV 34, mechanical power from the engine 2 is directly input to the transmission 4, and thus the power of the engine 2 is transmitted to the power transmission path downstream of the engine 2 at a high efficiency. It should be noted that, when the lockup clutch 33 is in the connected state, there is no circulating flow of working fluid within the torque converter 3, and fluid shearing resistance will be generated between the stator (reaction element) 3c and the lockup clutch 33. Therefore, when the lockup clutch 33 is in the connected state, a stator clutch (not shown) is released to make the stator 3c free.

The brake device 8 applies a braking force according to a brake force to the vehicle body and thereby reduces the vehicle body speed. The brake device 8 is designed such that the brake force is allowed to be effective by means of spring force or the like even while the engine is stopped. Pressure oil is supplied to an actuator (not shown) within the brake device 8 according to a current command (brake release command value) provided from the controller 15 to an ECMV 35, so that the actuator operates to change the brake force against the spring force. Specifically, when the brake release command value supplied to the ECMV 35 changes from 0% to 100%, the brake force of the brake device 8 changes from 100% to 0% in correspondence therewith.

The brake device 8 is activated in conjunction with the state of the forward clutch 17, the reverse clutch 19 and so on at the time of switching of the travel operation lever 36a without involving any manual operation (this type of brake is called FR interlocking brake), while it is also activated in response to manual operation (depression by foot) (this type of brake is called foot brake). A brake pedal 37 is provided in the operator's cab. The brake pedal 37 has an operation amount sensor 37a attached thereto for detecting an operation amount (depression amount) of the brake pedal. A detection signal of the operation amount sensor 37a is input to the controller 15.

The controller 15 generates a brake pressure (FR interlocking brake pressure) suitable for an FR interlocking brake. Additionally, the controller 15 generates a brake pressure (foot brake pressure) corresponding to the operation amount detected by the operation amount sensor 37a.

The controller 15 compares the FR interlocking brake pressure command value (%) with the foot brake pressure command value (%) and outputs a current command corresponding to the greater brake pressure command value to the ECMV 35.

The current command is a brake release command value. The brake force is set to 100% when the brake release command value is 0%. When either the FR interlocking brake pressure command value or the foot brake pressure command value is output from the controller 15 to the ECMV 35, the negative logic is applied such that the current command to the ECMV 35 is 100% when the brake pressure command value to be output is 0%, while the current command is 0% when the brake pressure command value is 100%. Such output values are determined by a logical structure within the controller, and therefore the present invention is not limited to this example.

Figure 3:
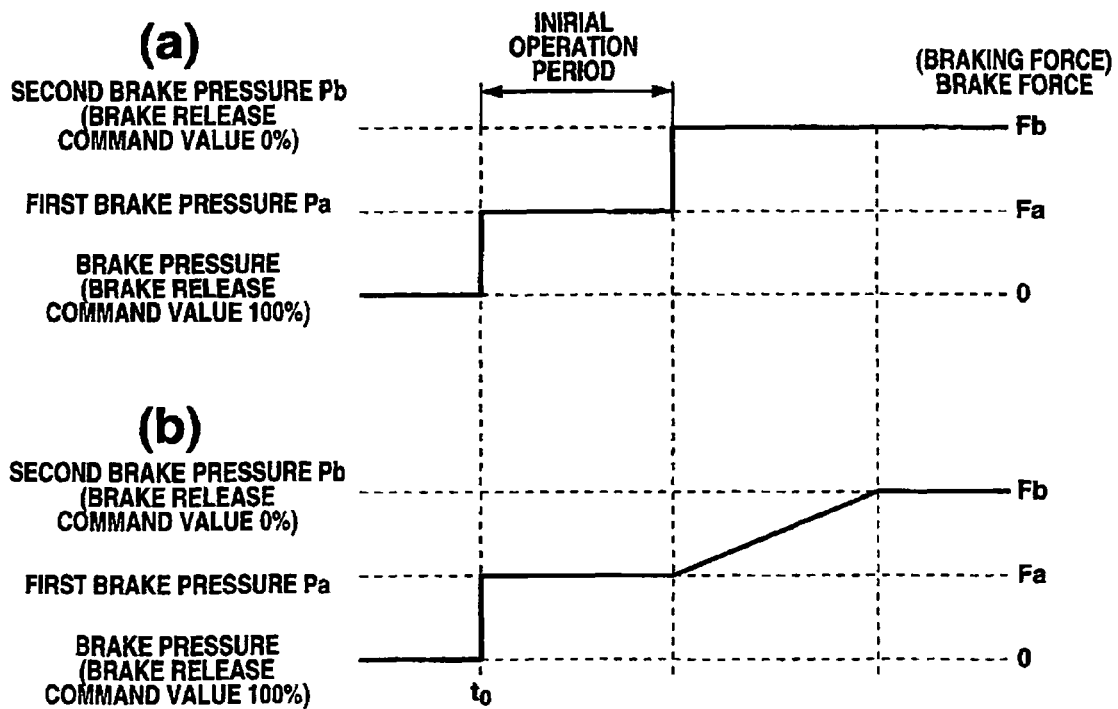
FIG. 3 consisted of parts (a) and (b) is a diagram showing examples of variation in brake pressure of the brake device.

A specific example of an FR interlocking brake pressure suitable for the FR interlocking brake will be described with reference to FIG. 3. The FR interlocking brake pressure consists of a first brake pressure (Pa) output for an arbitrarily determined initial operation period from the start of operation (t0 in FIG. 3), and a second brake pressure (Pb, indicated as a maximum pressure in the Figure) which is higher than the first brake pressure and output after the output of the first brake pressure. In FIG. 3, the brake release command values supplied from the controller 15 to the ECMV 35 are described in the parenthesis below the respective corresponding brake pressures. The brake force of the brake device 8 corresponding to each brake pressure is described on the right side (Fb denotes a brake force of 100%).

Part (a) of FIG. 3 shows an example in which the FR interlocking brake pressure is set such that after being held at the first brake pressure (Pa) during the initial operation period, it is changed stepwise to reach the second brake pressure (Pb). Part (b) of FIG. 3 shows an example in which the FR interlocking brake pressure is set such that after being held at the first brake pressure (Pa) during the initial operation period, it reaches the second brake pressure (Pb) in a predetermined period of time. It should be understood the setting of the FR interlocking brake pressure is not limited to these examples.

A travel operation device 36 is provided in the operator's cab. The travel operation device 36 has a travel operation lever 36a provided for selecting the forward travel gear 18 or the reverse travel gear 20, and a speed gear shifting switch 36b attached to the travel operation lever 36a for selectively switching the first to third speed gears 24 to 26.

The travel operation lever 36a is operation means for selecting an operation position from among the forward travel direction position F, the neutral position N, the reverse travel direction position R and so on. The travel operation lever 36a is switched from the forward travel direction position F to the reverse travel direction position R via the neutral position N or vice versa.

The travel operation lever 36a has an operation position sensor 36c attached thereto for detecting the operation position F, N, or R. The operation position sensor 36c is formed by a potentiometer, a limit switch, or the like.

When the travel operation lever 36a is operated, the operation position is detected by the operation position sensor 36c, and an operation position signal is output.

The operation position signal detected by the operation position sensor 36c is input to the controller 15.

The controller 15 is composed of an input interface for converting and shaping various input signals, a computer portion for performing arithmetic or logic operation on input data according to predetermined procedures, an output interface for converting the result thus obtained into an actuator actuating signal, and a memory for storing data and programs. For example, the CPU in the computer portion of the controller 15 computes a current vehicle body speed based on a transmission output shaft rotational speed signal input to the input interface from the rotational speed sensor 27.

There are stored, in the memory of the controller 15, an operation program corresponding to control logic shown in the flowchart of FIG. 4 to be described later, a reference value obtained by the computation, and a fuel injection characteristics map. An ECMV drive circuit is provided in the output interface of the controller 15, in association with each respective ECMV 28 to 32, 34, 35, 35, for power-amplifying a minute signal from the computer portion and supplying the power to the ECMV. A fuel injection device drive circuit is also provided in the output interface of the controller 15 for power-amplifying a minute signal from the computer portion and supplying the power to the actuator (electromagnetic valve) of the fuel injection device 14.

Description will be made of the definition of each flag required for activating and deactivating the FR interlocking brake, conditions for canceling and updating the flags, conditions for activating the brake, and conditions for releasing the brake.

Travel Direction Flag

This is a flag for determining whether the current travel direction of the vehicle body is the forward travel direction F or the reverse travel direction R on the basis of an operation position F, N, R selected by the travel operation lever 36a, a clutch oil pressure of the forward clutch 17 or the reverse clutch 19, and a vehicle body speed obtained from the detection signal of the rotational speed sensor 27.

This travel direction flag is updated from the reverse travel direction position R to the forward travel direction position F, or from the forward travel direction position F to the reverse travel direction position R, on the condition that the clutch oil pressure of the forward clutch 17 or reverse clutch 19 after the switching has reached the holding pressure, that is, the clutch has been shifted to the normal running state.

Specifically, the travel direction position of the travel operation lever 36a when the travel direction flag was previously updated is stored. If a clutch corresponding to a travel direction position after the switching has not reached the holding pressure when the travel operation lever 36a is switched to a travel direction position opposite to the previous travel direction position (when the travel operation lever 36a is switched from the forward travel direction position F to the reverse travel direction position R if the previous travel direction position is the forward travel direction position F, or switched from the reverse travel direction position R to the forward travel direction position F if the previous travel direction position is the reverse travel direction position R), the flag indicates the previous travel direction position (for example, if the reverse clutch 19 corresponding to the travel direction position R after the switching has not reached the holding pressure, the flag indicates "F", the previous travel direction position F). In contrast, if a clutch corresponding to a travel direction position after switching has reached the holding pressure, the flag indicates the travel direction position after switching (for example, if the reverse clutch 19 corresponding to the travel direction position R after the switching has reached the holding pressure, the flag indicates "R", or the travel direction position R).

The travel direction flag is updated to the neutral position N on the condition linked to a zero cross flag validation condition to be described later.

Specifically, if the zero cross flag has been invalidated when the travel operation lever 36a is switched to the neutral position N, the travel direction flag indicates the previous travel direction position (for example, if the previous travel direction position is F, the flag indicates "F"), whereas if the zero cross flag has been validated, the flag indicates the neutral position N.

FR Speed Change Flag

This is a flag for determining whether or not the brake device 8 is to be activated. If the vehicle body speed is greater than a predetermined threshold value (e.g. 2 km/h) when the travel operation lever 36a is switch-operated, the flag indicates "VALID", that is, "ON or logic 1 level". If the vehicle body speed is the predetermined threshold value or smaller when the travel operation lever 36a is switch-operated, the flag indicates "INVALID", that is, "OFF or logic 0 level". If the clutch oil pressure of the clutch after the switching (the forward clutch 17 or the reverse clutch 19) has reached the holding pressure, the FR speed change flag indicates "INVALID", that is, "OFF or logic 0 level".

Zero Cross Flag

This is a flag for determining whether or not the vehicle speed has reached approximately 0 km/h, and whether or not the brake device 8 is to be deactivated. If the vehicle body speed is smaller than a predetermined threshold value (e.g. 1 km/h), the flag indicates "VALID", that is, "ON, or logic 1 level", whereas if the vehicle body speed is the predetermined threshold value or greater, the flag indicates "INVALID", that is, "OFF, or logic 0 level". When the rotational speed sensor 27 is formed by an electromagnetic pickup, it is impossible to detect the rotational speed of zero (to measure the vehicle speed of zero). Therefore, the predetermined threshold value is set to a vehicle speed (1 km/h) that is very close to the vehicle speed of zero. If the clutch oil pressure of the clutch after the switching (the forward clutch 17 or the reverse clutch 19) has reached the holding pressure, the zero cross flag indicates "INVALID", that is, "OFF, or logic 0 level".

FR Interlocking Brake Activation Condition

The brake device 8 is activated when the following conditions (a) and (b) are satisfied simultaneously.

(a) The FR speed change flag is valid (ON).

(b) The travel direction position after switching of the travel operation lever 36a is opposite to the travel direction position indicated by the travel direction flag.

FR Interlocking Brake Deactivation Condition

The brake device 8 is deactivated when either the following condition (c) or (d) is satisfied.

(c) The zero cross flag is valid (ON).

(d) The forward clutch 17 or the reverse clutch 19 has exceeded the build up waiting time limit (filling time).

Processing in Case of Failure

If the rotational speed cannot be detected by the rotational speed sensor 27, it is determined that a failure has occurred, and then, the FR speed change flag is turned OFF, while the zero cross flag is turned ON, whereby the FR interlocking brake is deactivated.

It should be noted that the validation or the like of the flags sometimes makes it a condition that the forward clutch 17 or the reverse clutch 19 has reached the holding pressure. This holding pressure is determined not only by directly measuring the clutch oil pressure by means of a sensor or the like, but also by indirectly measuring the same by checking whether an engagement signal (after tm) shown in FIG. 2 is output or not. The build up waiting time limit can be determined by checking a flag which is provided in a program relating to engagement of the forward clutch 17 or the reverse clutch 19 such that it is determined whether the flag is valid or not depending on whether the build up waiting time limit has been exceeded or not.

Operation of this embodiment constituted as described above will be described with reference to the flowchart of FIG. 4 in conjunction with the time charts in FIGS. 6 to 10.

First Exemplary Embodiment

FIG. 6

Figure 6:
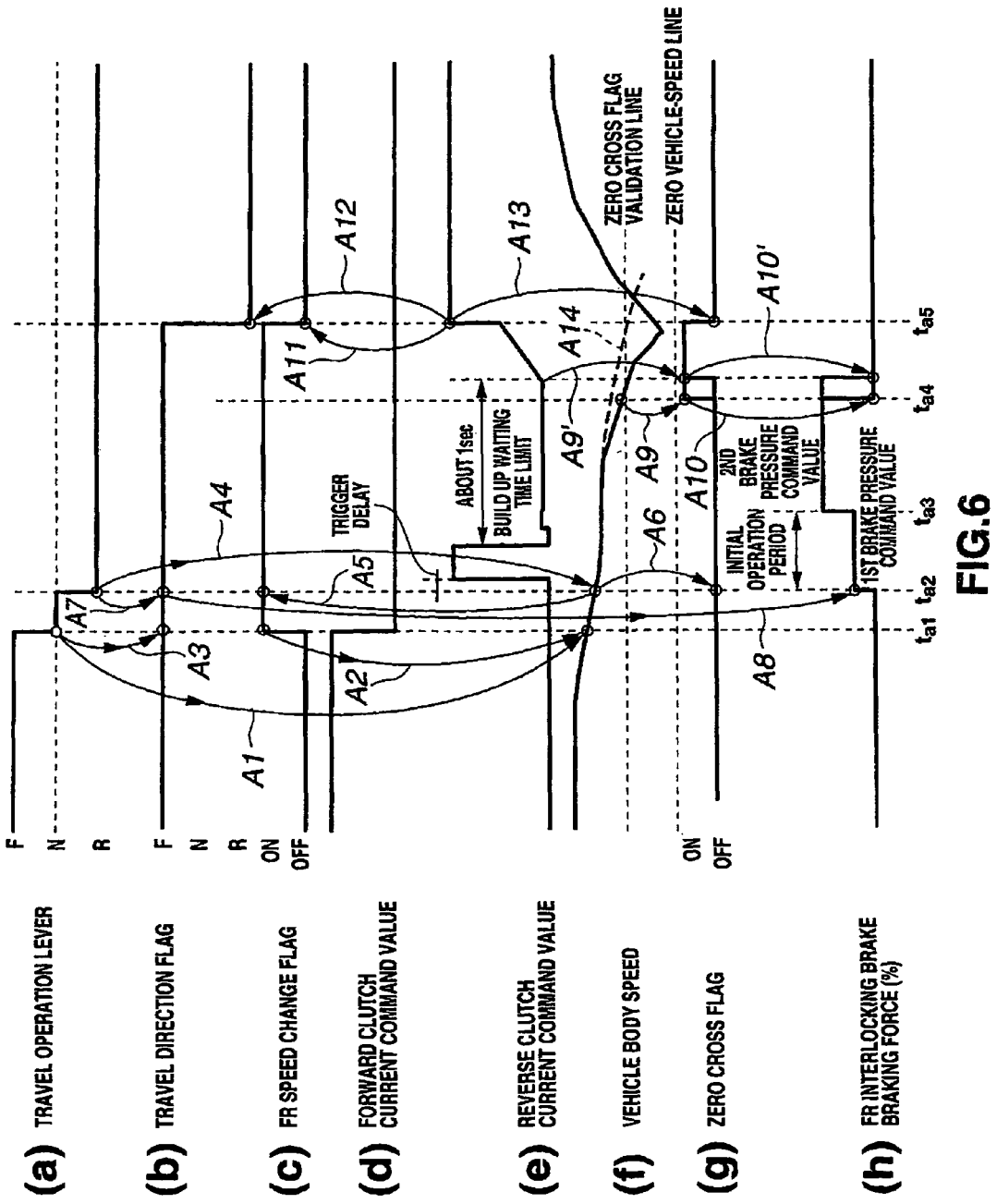
FIG. 6 consisted of parts (a) to (h) is a time chart according to the first exemplary embodiment.

FIG. 6 is a time chart illustrating a case in which the travel operation lever 36*a* is switched in the sequence of "F→N→R".

Part (a) of FIG. 6 shows how the switching operation position (F, N, R) of the travel operation lever 36*a* varies with time.

Part (b) of FIG. 6 show how the content of the travel direction flag (F, N, R) varies with time.

Part (c) of FIG. 6 shows how the content of the FR speed change flag (ON, OFF) varies with time.

Part (d) of FIG. 6 shows how the clutch current command value of the forward clutch 17 varies with time.

Part (e) of FIG. 6 shows how the clutch current command value of the reverse clutch 19 varies with time.

Part (f) of FIG. 6 shows how the vehicle speed varies with time.

Part (g) of FIG. 6 shows how the content of the zero cross flag (ON, OFF) varies with time.

Part (h) of FIG. 6 shows how the FR interlocking brake pressure command value varies with time.

In parts (a) to (h) of FIG. 6, the same position on the cross shaft indicates the same time.

Description will be made with reference to FIG. 4 and FIG. 6 together.

First, a current operation position (N) of the travel operation lever 36*a* is detected by the operation position sensor 36*c* (step 101; time ta1 in part (a) of FIG. 6). The travel direction position (forward travel direction position F) of the travel operation lever 36*a* before ta1 is stored in a predetermined memory used for storing travel direction flags.

When the travel operation lever 36*a* is switched from the operation position F to the operation position N (determined YES in step 102; time ta1 in part (a) of FIG. 6), it is determined whether or not the vehicle body speed is greater than a predetermined threshold value (first vehicle body speed threshold value) (step 121; see the arrow A1 in FIG. 6). Since the vehicle body speed is greater than the predetermined threshold value, the FR speed change flag is turned ON (step 122; see the arrow A2 in FIG. 6).

The travel direction flag continues to indicate the travel direction position F (see the arrow A3 in FIG. 6).

Description will be made of the clutch current command value. The forward clutch 17 and the reverse clutch 19 are connected/disconnected based on their operation position (current position) when the travel operation lever 36*a* is switched. At the time ta1 in part (a) of FIG. 6, the travel operation lever 36*a* is switched to the operation position N, and therefore the clutch current command values of the forward clutch 17 and the reverse clutch 19 both become zero.

When it is assumed that the operation position of the travel operation lever 36*a* is switched to F (forward travel direction) or R (reverse travel direction), the forward clutch 17 or reverse clutch 19 corresponding thereto is connected while the clutch of the opposite travel direction is disconnected. These series of clutch current command value processing steps are executed separately from this flowchart (FIG. 4) by a control program created based on the clutch operation as described in FIG. 2, starting at the time when the travel operation lever 36*a* is switched. Therefore, variation in the clutch current command value will be described by using the time chart, while description of the clutch operation in the flow of the flowchart will be omitted.

After the processing proceeds to step 113 in which the FR interlocking brake pressure is set to 0%, the processing proceeds from step 114 to step 115 or step 116. The processing steps from step 114 to step 115 or step 116 relate to processing of a signal output to the ECMV 35 for supplying brake force to the brake device 8, particulars of which will be described later.

When the processing proceeds to step 117, the processing then returns to step 101.

When the travel operation lever 36*a* is switched to the reverse travel direction position R via the neutral position N, the operation position R is detected by the operation position sensor 36*c* (step 101; time ta2 in part (a) of FIG. 6).

Since the travel operation lever 36*a* has been switched from the operation position N to the operation position R by then, it is determined YES in step 102, and it is determined whether or not the vehicle body speed is greater than the predetermined threshold value (step 121; see the arrow A4 in FIG. 6). Since the vehicle body speed is greater than the predetermined threshold value when the switching operation of the travel operation lever 36*a* is performed, the FR speed change flag is kept ON (step 122; see the arrow A5 in FIG. 6).

When the processing further proceeds to step 117, the processing returns to step 101 in which the current operation position of the travel operation lever 36*a* is detected.

Since the travel operation lever 36*a* has been switched to the reverse travel direction position R, it is determined NO in step 102, and the processing proceeds to determine whether the zero cross flag is VALID or INVALID (steps 103 and 104). It is determined whether or not the clutch is in the normal running state, which constitutes the condition for invalidating the zero cross flag, that is, whether or not the reverse clutch 19 corresponding to the travel direction position R after the switching has reached the holding pressure (step 103). It is determined NO in step 103 since, immediately after the switching, the reverse clutch 19 has not reached the holding pressure.

It is then determined whether or not the vehicle body speed is smaller than a predetermined threshold value (second vehicle body speed threshold value that is smaller than the first vehicle body speed threshold value), which constitutes the condition for validating the zero cross flag (step 104). Since the vehicle body speed is the predetermined threshold value or greater, the zero cross flag is kept OFF (determined NO in step 104; see the arrow A6 in FIG. 6).

It is then determined whether or not the FR interlocking brake deactivation condition (d) is satisfied, that is, whether or not the clutch after the switching has exceeded the build up waiting time limit (step 105). The reverse clutch 19 has not exceeded the build up waiting time limit immediately after the switching (determined NO in step 105).

It is then determined whether or not the FR interlocking brake activation conditions (a) and (b) have been satisfied simultaneously (steps 106, 107, and 108).

Specifically, it is first determined whether or not the FR speed change flag is ON (step 106). Since the FR speed change flag is ON (determined YES in step 106), it is then determined whether or not the travel direction position of the travel operation lever 36a after the switching is opposite to the travel direction position indicated by the travel direction flag (steps 107 and 108). The travel direction position of the travel operation lever 36a is the reverse travel direction position R, while travel direction flag indicates the forward travel direction position F opposite thereto (determined YES in step 108; see the arrow A7 in FIG. 6). Therefore, it is determined that the FR interlocking brake activation conditions (a) and (b) are satisfied simultaneously. It is further determined whether or not the FR interlocking brake deactivation condition (c) has been established, that is, whether or not the zero cross flag is ON (step 109). Since the zero cross flag is OFF and the FR interlocking brake deactivation condition is not established, it is determined that the FR interlocking brake is to be activated (determined NO in step 109). According to this determination, a current command for activating the brake device 8 is output to the ECMV 35 used for the brake device 8 (steps 110 to 116; see the arrow A8 in FIG. 6).

Specifically, if the initial operation period has not elapsed from the time of determining that the FR interlocking brake is to be activated (determined YES in step 110), a first brake pressure command value is set as described in FIG. 3 (step 111). Subsequently, the currently set FR interlocking brake pressure command value (first brake pressure command value) is compared with a foot brake pressure command value (step 114), and a current command corresponding to the greater brake pressure command value is output to the ECMV 35 (steps 115 and 116).

If the FR interlocking brake pressure command value is equal to or greater than the foot brake pressure command value (determined NO in step 114), a brake force corresponding to a first brake pressure Pb is generated by the brake device 8 during the initial operation period (step 115; time ta2 to time ta3 in part (h) of FIG. 6).

Further, when the initial operation period has elapsed from the time of determining that the FR interlocking brake is to be activated (determined NO in step 110), a second brake pressure command value is set as described in FIG. 3 (step 112). Subsequently, the currently set FR interlocking brake pressure command value (second brake pressure command value) is compared with the foot brake pressure command value (step 114), and a current command corresponding to the greater brake pressure command value is output to the ECMV 35 (steps 115, 116).

If the FR interlocking brake pressure command value is equal to or greater than the foot brake pressure command value (determined NO in step 114), a brake force corresponding to a second brake pressure Pc is generated by the brake device 8 (step 115; time ta3 to ta4 in part (h) of FIG. 6).

After proceeding to step 117, the processing returns to step 101, in which the current operation position of the travel operation lever 36a is detected.

Since the travel operation lever 36a has been switched to the reverse travel direction position R, it is determined NO in step 102, and the processing proceeds to the next step 103 in which it is determined whether or not the clutch after the switching is in the normal running state, which constitutes the condition for invalidating the zero cross flag, that is, whether or not the reverse clutch 19 corresponding to the travel direction position R after the switching has reached the holding pressure (step 103).

It is then determined whether or not the vehicle body speed is smaller than a predetermined threshold value, which constitutes the zero cross flag validation condition (step 104). Since the FR interlocking brake has already been activated, the vehicle body speed has been reduced and hence is smaller than the predetermined threshold value (determined YES in step 104). Therefore, the zero cross flag indicates ON (step 125; see the arrow A9 in FIG. 6). The FR interlocking brake release condition is established by the zero cross flag indicating ON, and the FR interlocking brake is set to 0% (step 113). As a result, the brake force generated by the brake device 8 is null unless the foot brake is activated (steps 115 and 116; see the arrow A10 in FIG. 6). Even if the vehicle speed remains high as indicated by the broken line A14 in part (f) of FIG. 6, the processing proceeds to step 125 when it is determined in step 105 that the FR interlocking brake deactivation condition (d) is satisfied and the build up waiting time limit has been exceeded. The zero cross flag is set to ON and the FR interlocking brake pressure command value is set to 0% (deactivation) (step 113). The processing then proceeds to step 117 through a processing flow for activating the brake device 8. Specifically, as indicated by the arrows A9' and A10' in FIG. 6, the zero cross flag becomes ON and the FR interlocking brake is deactivated.

After proceeding to step 117, the processing returns to step 101, in which the current operation position of the travel operation lever 36a is detected.

Since the travel operation lever 36a has been switched to the reverse travel direction position R, it is determined NO in step 102 and the processing proceeds to the next step 103, in which it is determined whether or not the clutch after the switching is in the normal running state, that is, whether or not the reverse clutch 19 corresponding to the travel direction position R after the switching has reached the holding pressure (step 103).

When the reverse clutch 19 reaches the holding pressure (normal running state) (determined YES in step 103; time ta5 in part (e) of FIG. 6), the FR speed change flag becomes OFF (step 118; see the arrow A11 in FIG. 6), the travel direction flag is updated to the current operation position, or the reverse travel direction position R (step 119; see the arrow A12 in FIG. 6), and the zero cross flag becomes OFF (step 120; see the arrow A13 in FIG. 6).

According to the first exemplary embodiment as described above, if the switching operation of the travel operation lever 36a is performed in the sequence of F→N→R when the vehicle speed is high, the FR interlocking brake is activated during the switching operation. This reduces the thermal load on the clutch as well as the transmission shock.

Second Exemplary Embodiment

FIG. 7

Figure 7:
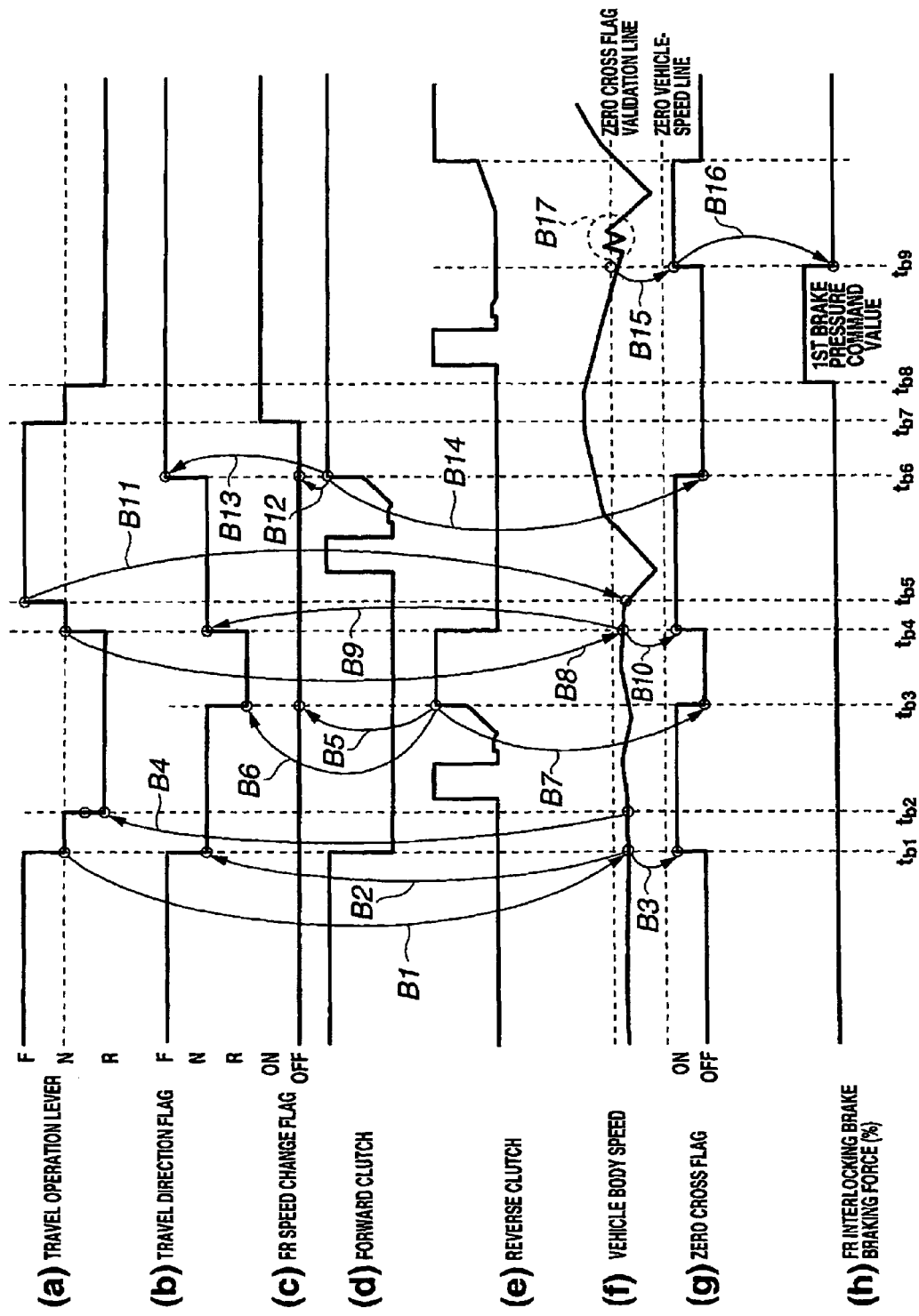
FIG. 7 consisted of parts (a) to (h) is a time chart according to the second exemplary embodiment.

FIG. 7 is a time chart illustrating a case in which the switching operation of the travel operation lever 36a is performed in the sequence of "F→N→R→N→F→N→R".

Parts (a) to (h) of FIG. 7 correspond to parts (a) to (h) of FIG. 6, respectively.

Description will be made with reference to FIG. 4 and FIG. 7 together.

First, a current operation position (N) of the travel operation lever 36a is detected by the operation position sensor 36c (step 101; time tb1 in part (a) of FIG. 7).

Since the travel operation lever 36a has been switched from the operation position F to the operation position N, it is determined YES in step 102, and it is determined whether or not the vehicle body speed is greater than a predetermined threshold value (step 121; see the arrow B1 FIG. 7). The FR speed change flag remains OFF since the vehicle speed is low and the vehicle body speed is the predetermined threshold value or lower when the switching operation of the travel operation lever 36a is performed (determined NO in step 121).

After proceeding to step 117, the processing returns to step 101 in which the current operation position of the travel operation lever 36a is detected.

Since the travel operation lever 36a has been switched to the neutral position N, it is determined NO in step 102, and the processing proceeds to the next step 103, in which it is determined whether of not the clutch is in the normal running state, which constitutes the zero cross flag invalidation condition (step 103). Since neither the forward clutch 17 nor the reverse clutch 19 has reached the holding pressure (determined NO in step 103), it is then determined whether or not the vehicle body speed is smaller than a predetermined threshold value, which constitutes the zero cross flag validation condition (step 104). Since the vehicle body speed is low, the vehicle body speed is smaller than the predetermined threshold value (determined YES in step 104). Subsequently, it is determined whether or not the current operation position is the neutral position N (step 123). Since the current operation position is the neutral position N (determined YES in step 123), the travel direction flag is updated to the neutral position N (step 124; see the arrow B2 in FIG. 7), the zero cross flag is turned ON (step 125; see the arrow B3 in FIG. 7).

After proceeding to step 117, the processing returns to step 101, in which the current operation position of the travel operation lever 36a is detected.

When the travel operation lever 36a is switched to the reverse travel direction position R via the neutral position N, the operation position R is detected by the operation position sensor 36c (step 101; time tb2 in part (a) of FIG. 7).

When the travel operation lever 36a is switched from the operation position N to the operation position R (determined YES in step 102; time tb2 in part (a) of FIG. 7), it is determined whether of not the vehicle body speed is greater than the predetermined threshold value (step 121; see the arrow B4 in FIG. 7). The FR speed change flag remains OFF since the vehicle speed is low and the vehicle body speed is equal to or smaller than the predetermined threshold value when the switching operation of the travel operation lever 36a is performed (determined NO in step 121).

After proceeding to step 117, the processing returns to step 101, in which the current operation position of the travel operation lever 36a is detected.

Since the travel operation lever 36a has been switched to the reverse travel direction position R, it is determined NO in step 102, and the processing proceeds to the next step 103, in which it is determined whether or not the clutch after the switching is in the normal running state, that is, whether or not the reverse clutch 19 corresponding to the travel direction position R after the switching has reached the holding pressure (step 103). Since the reverse clutch 19 has not reached the holding pressure (determined NO in step 103), it is then determined whether or not the vehicle body speed is smaller than a predetermined threshold value (step 104). Since the vehicle body speed is low, the vehicle body speed is smaller than the predetermined threshold value (determined YES in step 104). Accordingly, the zero cross flag is kept ON (step 125), the FR interlocking brake pressure command value is set to 0% (step 113), and the FR interlocking brake is not activated. As described above, the FR interlocking brake is not activated even if the switching operation is conducted in the sequence of "F→N→R" when the vehicle speed is low.

When the reverse clutch 19 reaches the holding pressure in due course (normal running state) (determined YES in step 103; time tb3 in part (e) of FIG. 7), the FR speed change flag remains OFF (step 118; see the arrow B5 in FIG. 7), the travel direction flag is updated to the reverse travel direction position R as the current operation position (step 119; see the arrow B6 in FIG. 7), and the zero cross flag is turned OFF (step 120; see the arrow B7 in FIG. 7).

After proceeding to step 117, the processing returns to step 101, in which the current operation position of the travel operation lever 36a is detected.

When the travel operation lever 36a is switched from the operation position R to the operation position N (determined YES in step 102; time tb4 in part (a) of FIG. 7), it is determined whether or not the vehicle body speed is greater than the predetermined threshold value (step 121; see the arrow B8 in FIG. 7). The FR speed change flag remains OFF since the vehicle speed is low, and the vehicle body speed is equal to or smaller than the predetermined threshold value when the switching operation of the travel operation lever 36a is performed (determined NO in step 121).

After proceeding to step 117, the processing returns to step 101, in which the current operation position of the travel operation lever 36a is detected.

Since the travel operation lever 36a has been switched to the neutral position N, it is determined NO in step 102, and the processing proceeds to the next step 103, in which it is determined whether or not the clutch is in the normal running state (step 103). Since neither the forward clutch 17 nor the reverse clutch 19 has reached the holding pressure (determined NO in step 103), it is then determined whether or not the vehicle body speed is smaller than the predetermined threshold value (step 104). Since the vehicle body speed is low, the vehicle body speed is smaller than the predetermined threshold value (determined YES in step 104). Subsequently, it is determined whether or not the current operation position is the neutral position N (step 123). Since the current operation position is the neutral position N (determined YES in step 123), the travel direction flag is updated to the neutral position N (step 124; see the arrow B9 in FIG. 7), and the zero cross flag is turned ON (step 125; see the arrow B10 in FIG. 7).

After proceeding to step 117, the processing returns to step 101, in which the current operation position of the travel operation lever 36a is detected.

When the travel operation lever 36a is switched to the forward travel direction position F via the neutral position N, the operation position F is detected by the operation position sensor 36c (step 101; time tb5 in part (a) of FIG. 7).

When the travel operation lever 36a is switched from the operation position N to the operation position F (determined YES in step 102; time tb5 in part (a) of FIG. 7), it is determined whether or not the vehicle body speed is greater than the predetermined threshold value (step 121; see the arrow B11 in FIG. 7). The FR speed change flag remains OFF since the vehicle speed is low, and the vehicle body speed is equal to or smaller than the predetermined threshold value when the switching operation of the travel operation lever 36a is conducted (determined NO in step 121).

After proceeding to step 117, the processing returns to step 101, in which the current operation position of the travel operation lever 36a is detected.

Since the travel operation lever 36a has been switched to the forward travel direction position F, it is determined NO in step 102, and the processing proceeds to the next step 103, in which it is determined whether or not the clutch after the switching is in the normal running state, that is, whether or not the forward clutch 17 corresponding to the travel direction position F after the switching has reached the holding pressure (step 103). Since the forward clutch 17 has not reached the holding pressure (determined NO in step 103), it is then determined whether or not the vehicle body speed is smaller than the predetermined threshold value (step 104). Since the vehicle body speed is low, the vehicle body speed is smaller than the predetermined threshold value (determined YES in step 104). Accordingly, the zero cross flag is kept ON (step 125), the FR interlocking brake pressure command value is set to 0% (step 113), and the FR interlocking brake is not activated. As described above, the FR interlocking brake is not activated even if switching operation is performed in the sequence of "R→N→F" when the vehicle speed is low.

When the forward clutch 17 reaches the holding pressure (normal running state) in due course (determined YES in step 103; time tb6 in part (d) of FIG. 7), the FR speed change flag remains OFF (step 118; see the arrow B12 in FIG. 7), the travel direction flag is updated to the forward travel direction position F as the current operation position (step 119; see the arrow B13 in FIG. 7), and the zero cross flag is turned OFF (step 120; see the arrow B14 in FIG. 7).

After proceeding to step 117, the processing returns to step 101, in which the current operation position of the travel operation lever 36a is detected.

After that, when the travel operation lever 36a is switched in the sequence of "F→N→R" at time tb7 to tb8, the FR interlocking brake is activated in a similar manner to the operations at time ta1 to ta2 in FIG. 6 (step 115; time tb8 onwards).

After proceeding to step 117, the processing returns to step 101, in which the current operation position of the travel operation lever 36a is detected.

Since the travel operation lever 36a has been switched to the reverse travel direction position R, it is determined NO in step 102, and the processing proceeds to the next step 103, in which it is determined whether or not the clutch after the switching is in the normal running state, that is, whether or not the reverse clutch 19 corresponding to the travel direction position R after the switching has reached the holding pressure (step 103). Since the reverse clutch 19 has not reached the holding pressure (determined NO in step 103), it is then determined whether or not the vehicle body speed is smaller than a predetermined threshold value (step 104). Since the FR interlocking brake has already been activated, the vehicle body speed has been reduced and hence the vehicle body speed is smaller than the predetermined threshold value (determined YES in step 104). Accordingly, the zero cross flag indicates ON (step 125; see the arrow B15 in FIG. 7). Since the zero cross flag is ON, the FR interlocking brake deactivation condition is satisfied, and the FR interlocking brake command value is set to 0% (step 113). As a result, the brake force generated by the brake device 8 is null unless the foot brake is activated (steps 115 and 116; see the arrow B16 in FIG. 7).

When the vehicle is traveling down the sloping ground, for example, the vehicle speed sometimes fluctuates around the threshold value set for determining validation of the zero cross flag, as indicated by B17 in part (f) of FIG. 7.

However, once the zero cross flag is set to ON, the zero cross flag is not turned OFF unless the state is shifted to the normal running state (unless it is determined YES in step 103). Therefore, the FR interlocking brake remains in the state in which it is set to the holding pressure (determined YES in step 109, step 113), hunting will not be caused to activate or deactivate the FR interlocking brake.

According to the second exemplary embodiment, as described above, the brake device 8 is controlled such that if the travel operation lever 36a is switched in the sequence of F→N→R or R→N→F when the vehicle speed is low, the FR interlocking brake is not activated during this switching operation. This prevents an uncomfortable operation feeling caused by unnecessary activation of the brake, and improves the working efficiency. When the vehicle speed is subsequently increased and the travel operation lever 36a is switched in the sequence of F→N→R, the FR interlocking brake is activated. This reduces the thermal load on the clutch and the transmission shock.

Third Exemplary Embodiment

FIG. 8

Figure 8:
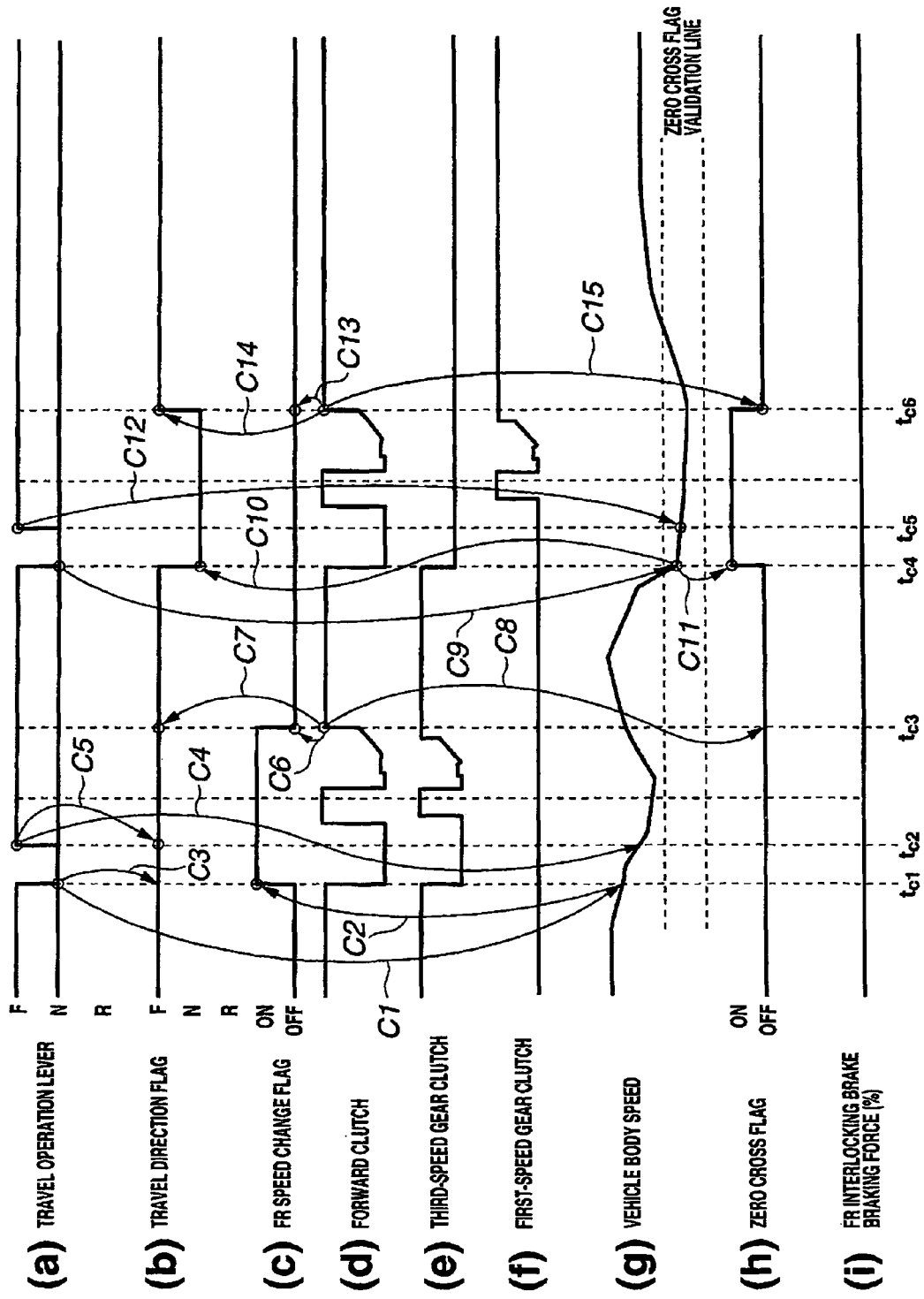
FIG. 8 consisted of parts (a) to (i) is a time chart according to the third exemplary embodiment.

FIG. 8 is a time chart illustrating a case in which the travel operation lever 36a is switched in the sequence of "F→N→F→N→F".

Parts (a), (b), (c), (d), (g), (h), and (i) of FIG. 8 correspond to parts (a), (b), (c), (d), (f), (g), and (h), of FIG. 6 respectively. Parts (e) and (f) of FIG. 8 respectively illustrate how the clutch oil pressure of the speed-change clutches 23 and 21 (third-speed clutch and first-speed clutch) varies with time. Operation relating to engagement of the speed-change clutches 23 and 21 is the same as that of the forward clutch 17 and the reverse clutch 19.

Description will be made with reference to FIG. 4 and FIG. 8 together.

First, a current operation position (N) of the travel operation lever 36a is detected by the operation position sensor 36c (step 101; time tc1 in part (a) of FIG. 8).

When the travel operation lever 36a is switched from the operation position F to the operation position N (determined YES in step 102; time tc1 in part (a) of FIG. 8), it is determined whether or not the vehicle body speed is greater than a predetermined threshold value (step 121; see the arrow C1 in FIG. 8). Since the vehicle speed is high, and the vehicle body speed is greater than the predetermined threshold value when the switching operation of the travel operation lever 36a is performed (determined YES in step 121), the FR speed change flag is turned ON (step 122; see the arrow C2 in FIG. 8).

In the meantime the travel direction flag remains at the forward travel direction position F.

After proceeding to step 117, the processing returns to step 101, in which an operation position of the current travel operation lever 36a is detected.

Since the travel operation lever 36a has been switched to the neutral position N, it is determined NO in step 102, and the processing proceeds to the next step 103, in which it is determined whether or not the clutch is in the normal running state (step 103). Since neither the forward clutch 17 nor the reverse clutch 19 has reached the holding pressure (determined NO in step 103), it is then determined whether or not the vehicle body speed is smaller than the predetermined threshold value (step 104). Since the vehicle body speed is high, the vehicle body speed is equal to or higher than the predetermined threshold value (determined NO in step 104).

Subsequently, it is determined whether or not the forward clutch 17 and the reverse clutch 19 have reached the build up waiting time limit (step 105). Neither the forward clutch 17 nor the reverse clutch 19 has reached the build up waiting time limit (determined NO in step 105). Therefore, it is determined that the FR interlocking brake deactivation condition (d) is not satisfied, and it is then determined whether or not the FR interlocking brake activation conditions (a) and (b) are satisfied simultaneously (steps 106, 107 and 108).

Specifically, it is first determined whether or not the FR speed change flag is ON (step 106). Since the FR speed change flag is ON (determined YES in step 106), it is then determined whether or not the travel direction position of the travel operation lever 36a after the switching is opposite to the travel direction position indicated by the travel direction flag (steps 107 and 108). The operation position after the switching is the neutral position N, while the travel direction flag indicates the forward travel direction position F. Since these travel direction positions are not opposite to each other (determined NO in step 107, and determined NO in step 108; see the arrow C3 in FIG. 8), it is determined that the FR interlocking brake activation conditions (a) and (b) are not satisfied simultaneously, and the processing proceeds to step 113. As a result, the processing goes on to step 117 while the FR interlocking brake is kept in the inactivated state.

After proceeding to step 117, the processing returns to step 101, in which the current operation position of the travel operation lever 36a is detected.

When the travel operation lever 36a is switched again to the forward travel direction position F via the neutral position N, the operation position F is detected by the operation position sensor 36c (step 101; time tc2 in part (a) of FIG. 8).

When the travel operation lever 36a is switched from the operation position N to the operation position F (determined YES in step 102; time tc2 in part (a) of FIG. 8), it is determined whether or not the vehicle body speed is greater than the predetermined threshold value (step 121; see the arrow C4 FIG. 8). Since the vehicle speed is high, and the vehicle body speed is greater than the predetermined threshold value when the switching operation of the travel operation lever 36a is performed, the FR speed change flag is kept ON (determined YES in step 121 and step 122).

After proceeding to step 117, the processing returns to step 101, in which the current operation position of the travel operation lever 36a is detected.

Since the travel operation lever 36a has been switched to the forward travel direction position F, it is determined NO in step 102, and the processing proceeds to the next step 103, in which it is determined whether or not the clutch is in the normal running state (step 103).

Since the forward clutch 17 after the switching has not reached the holding pressure (determined NO in step 103), it is then determined whether or not the vehicle body speed is smaller than the predetermined threshold value (step 104). Since the vehicle body speed is high, the vehicle body speed is equal to or greater than the predetermined threshold value (determined NO in step 104). Subsequently, it is determined whether or not the forward clutch 17 and the reverse clutch 19 have reached the build up waiting time limit (step 105). The forward clutch 17 has not reached the build up waiting time limit (determined NO in step 105). It is therefore determined that the FR interlocking brake deactivation condition (d) is not satisfied, and then it is determined whether or not the FR interlocking brake activation conditions (a) and (b) are satisfied simultaneously (steps 106, 107 and 108).

Specifically, it is first determined whether or not the FR speed change flag is ON (step 106). Since the FR speed change flag is ON (determined YES in step 106), it is then determined whether or not the travel direction position of the travel operation lever 36a after the switching and the travel direction position indicated by the travel direction flag are opposite to each other (steps 107 and 108). The travel direction position after the switching is the forward travel direction position F, while the travel direction position indicated by the travel direction flag is also the forward travel direction position F, and hence they are not opposite to each other (determined NO in step 107 and determined NO in step 108; see the arrow C5 in FIG. 8). Therefore, it is determined that the FR interlocking brake activation conditions (a) and (b) are not satisfied simultaneously, and the processing proceeds to step 113. As a result, the processing goes on to step 117 while the FR interlocking brake is kept in the inactivated state.

After proceeding to step 117, the processing returns to step 101, in which the current operation position of the travel operation lever 36a is detected.

Since the travel operation lever 36a has been switched to the forward travel direction position F, it is determined NO in step 102 and the processing proceeds to the next step 103, in which it is determined whether or not the clutch after the switching is in the normal running state, that is, whether or not the forward clutch 17 corresponding to the travel direction position F after the switching has reached the holding pressure (step 103).

When the forward clutch 17 reaches the holding pressure (normal running state) (determined YES in step 103; time tc3 in part (d) of FIG. 8), the FR speed change flag is turned OFF (step 118; see the arrow C6 in FIG. 8), the travel direction flag continues to indicate the current operation position, or the forward travel direction position F (step 119; see the arrow C7 in FIG. 8), and the zero cross flag remains OFF (step 120; see the arrow C8 in FIG. 8).

After proceeding to step 117, the processing returns to step 101, in which the current operation position of the travel operation lever 36a is detected.

It should be noted that, when the duration of time spent at the neutral position N is short during a switching operation conducted in the sequence of "F→N→F" and the vehicle speed is high, the processing is performed to connect to the speed-change clutch 23 of the speed gear (third-speed gear) before the gear change regardless of which speed gear is selected (see part (e) of FIG. 8).

Description will be made of a case in which switching operation is performed in the sequence of "F→N→F" with the vehicle speed being reduced.

A current operation position (N) of the travel operation lever 36a is detected by the operation position sensor 36c (step 101; time tc4 in part (a) of FIG. 8).

When the travel operation lever 36a is switched from the operation position F to the operation position N (determined YES in step 102; time tc4 in part (a) of FIG. 8), it is determined whether or not the vehicle body speed is greater than a predetermined threshold value (step 121; see the arrow C9 FIG. 8). Since the vehicle speed is low and the vehicle body speed is equal to or smaller than the predetermined threshold value when the switching operation of the travel operation lever 36a is performed (determined NO in step 121), the FR speed change flag is kept OFF.

After proceeding to step 117, the processing returns to step 101, in which the current operation position of the travel operation lever 36a is detected.

Since the travel operation lever 36a has been switched to the neutral position N, it is determined NO in step 102, and the processing proceeds to the next step 103 in which it is determined whether or not the clutch is in the normal running state (step 103).

Since neither the forward clutch 17 nor the reverse clutch 19 has reached the holding pressure (determined NO in step 103), it is then determined whether or not the vehicle body speed is smaller than the predetermined threshold value (step 104). Since the vehicle body speed is low, the vehicle body speed is smaller than the predetermined threshold value (determined YES in step 104). Subsequently, it is determined whether or not the current operation position is the neutral position N (step 123). Since the current operation position is the neutral position N (determined YES in step 123), the travel direction flag is updated to the neutral position N (step 124; see the arrow C10 in FIG. 8) and the zero cross flag is turned ON (step 125; see the arrow C11 in FIG. 8).

After proceeding to step 117, the processing returns to step 101, in which the current operation position of the travel operation lever 36a is detected.

When the travel operation lever 36a is switched from the operation position N to the operation position F (determined YES in step 102; time tc5 in part (a) of FIG. 8), it is determined whether or not the vehicle body speed is greater than the predetermined threshold value (step 121; see the arrow C12 in FIG. 8). Since the vehicle speed is low and the vehicle body speed is equal to or smaller than the predetermined threshold value when the switching operation of the travel operation lever 36a is performed, the FR speed change flag is kept OFF (determined NO in step 121).

After proceeding to step 117, the processing returns to step 101, in which the current operation position of the travel operation lever 36a is detected.

Since the travel operation lever 36a has been switched to the forward travel direction position F, it is determined NO in step 102, and the processing proceeds to the next step 103 in which it is determined whether or not the clutch is in the normal running state (step 103).

Since the forward clutch 17 after the switching has not reached the holding pressure (determined NO in step 103), it is then determined whether or not the vehicle body speed is smaller than the predetermined threshold value (step 104). Since the vehicle body speed is low, the vehicle body speed is smaller than the predetermined threshold value (determined YES in step 104). Accordingly, the zero cross flag is kept ON (step 125).

After that, the processing proceeds to step 113 and goes on to step 117 with the FR interlocking brake being kept in the inactivated state.

After proceeding to step 117, the processing returns to step 101, in which the current operation position of the travel operation lever 36a is detected.

Since the travel operation lever 36a has been switched to the forward travel direction position F, it is determined NO in step 102 and the processing proceeds to the step 103 in which it is determined whether or not the clutch after the switching is in the normal running state, that is, whether or not the forward clutch 17 corresponding to the travel direction position F has reached the holding pressure (step 103).

When the forward clutch 17 reaches the holding pressure (normal running state) (determined YES in step 103; time tc6 in part (d) of FIG. 8), the FR speed change flag remains OFF (step 118; see the arrow C13 in FIG. 8), the travel direction flag is updated to the forward travel direction position F as the current operation position (step 119; see the arrow C14 in FIG. 8), and the zero cross flag is turned OFF (step 120; see the arrow C15 in FIG. 8).

After proceeding to step 117, the processing returns to step 101, in which the current operation position of the travel operation lever 36a is detected.

It should be noted that, when the duration of time spent at the neutral position N is short during a switching operation conducted in the sequence of "F→N→F" and the vehicle speed is low, the processing is performed to connect to the speed-change clutch 21 of the first-speed gear regardless of which speed gear is selected (see part (f) of FIG. 8). As the vehicle speed is increased, the speed gear is automatically shifted to the second speed gear and to the third speed gear.

According to the third exemplary embodiment as described above, the brake device 8 is controlled such that the FR interlocking brake is not activated when operation is performed in the sequence of "F→N→F→N→F". Thus the operation is enabled exactly according to the operator's intention to allow the vehicle body to continue traveling forward without activating the brake. This eliminates uncomfortable operation feeling caused by unnecessary activation of the brake, and improves the working efficiency.

Fourth Exemplary Embodiment

FIG. 9

Figure 9:
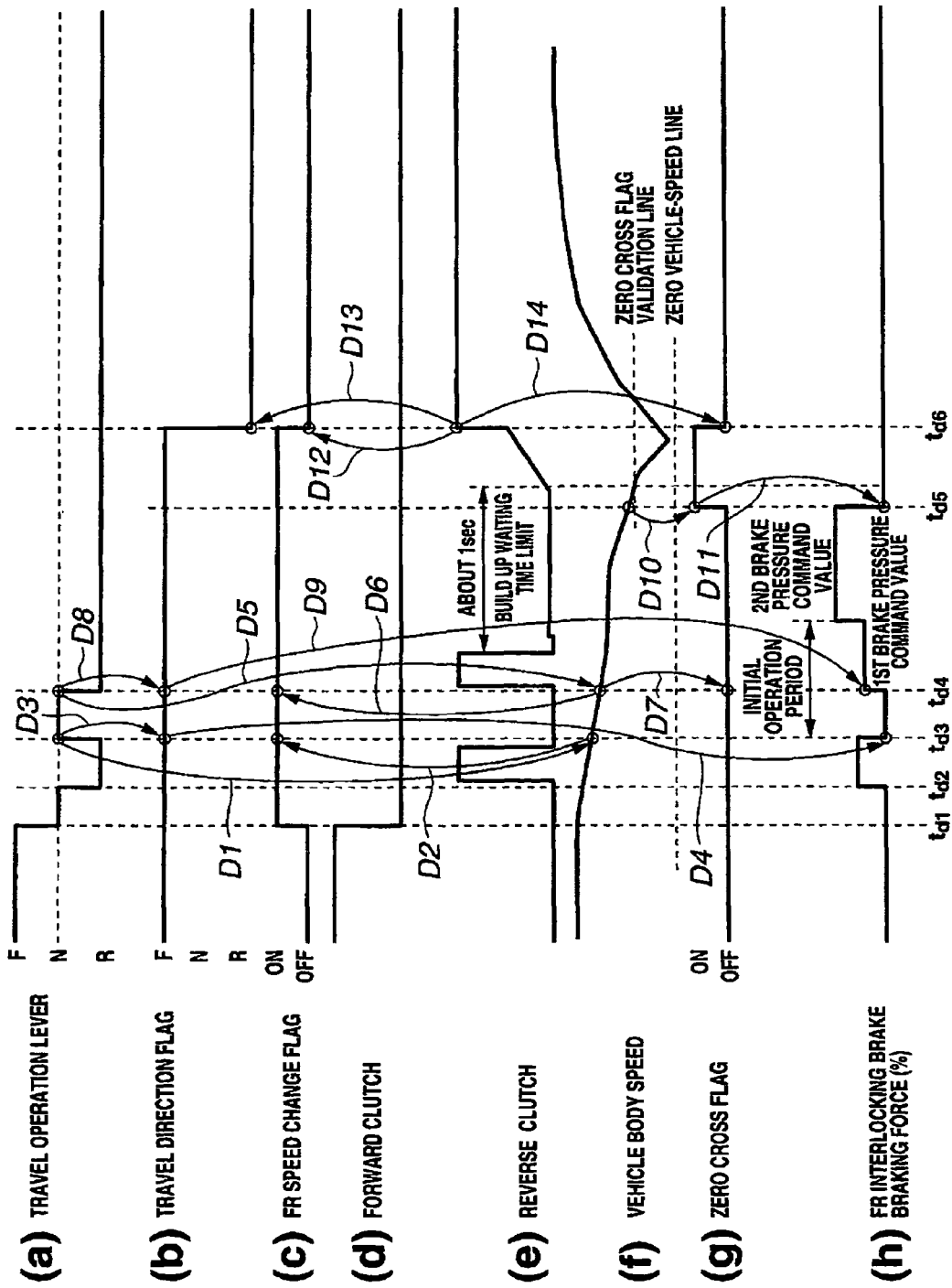
FIG. 9 consisted of parts (a) to (h) is a time chart according to the fourth exemplary embodiment.

FIG. 9 is a time chart illustrating a case in which the travel operation lever 36a is switched in the sequence of "F→N→R→N→R".

Parts (a) to (h) of FIG. 9 correspond to parts (a) to (h) of FIG. 6, respectively.

Description will be made with reference to FIG. 4 and FIG. 9 together.

When the travel operation lever 36a is switched at time td1 to td2 in the sequence of "F→N→R", the FR interlocking brake is activated in the same manner as the operations at time ta1 to ta2 in FIG. 6 (step 115; time td2 and onwards).

After proceeding to step 117, the processing returns to step 101, in which the current operation position of the travel operation lever 36a is detected.

When the travel operation lever 36a is switched from the operation position R to the operation position N (determined YES in step 102; time td3 in part (a) of FIG. 9), it is determined whether or not the vehicle body speed is greater than a predetermined threshold value (step 121; see the arrow D1 in FIG. 9). Since the vehicle speed is high and the vehicle body speed is greater than the predetermined threshold value when the switching operation of the travel operation lever 36a is performed (determined YES in step 121), the FR speed change flag is kept ON (step 122; see the arrow D2 in FIG. 9). On the other hand, the travel direction flag continues to indicate the forward travel direction position F.

After proceeding to step 117, the processing returns to step 101, in which the current operation position of the travel operation lever 36a is detected.

Since the travel operation lever 36a has been switched to the neutral position N, it is determined NO in step 102 and the processing proceeds to the next step 103 in which it is determined whether or not the clutch is in the normal running state (step 103).

Since neither the forward clutch 17 nor the reverse clutch 19 has reached the holding pressure (determined NO in step 103), it is then determined whether or not the vehicle body speed is smaller than the predetermined threshold value (step 104). Since the vehicle body speed is high, the vehicle body speed is equal to or greater than the predetermined threshold value (determined NO in step 104). Subsequently, it is determined whether or not the forward clutch 17 and the reverse clutch 19 have reached the build up waiting time limit (step 105). Neither the forward clutch 17 nor the reverse clutch 19 has reached the build up waiting time limit (determined NO in step 105). Therefore, it is determined that the FR interlocking brake deactivation condition (d) is not satisfied, and it is subsequently determined whether or not the FR interlocking brake activation conditions (a) and (b) are satisfied simultaneously (steps 106, 107, and 108).

Specifically, it is first determined whether or not the FR speed change flag is ON (step 106). Since the FR speed change flag is ON (determined YES in step 106), it is then determined whether or not the travel direction position of the travel operation lever 36a after the switching and the travel direction position indicated by the travel direction flag are opposite to each other (steps 107 and 108). The operation position after the switching is the neutral position N, while the travel direction flag indicates the forward travel direction position F. Since these travel direction positions are not opposite to each other (determined NO in step 107 and determined NO in step 108; see the arrow D3 in FIG. 9), it is determined that the FR interlocking brake activation conditions (a) and (b) are not satisfied simultaneously, and the processing proceeds to step 113. Accordingly, the FR interlocking brake pressure command value is set to 0% (step 113), and the brake force generated by the brake device 8 is null unless the foot brake is activated (steps 115 and 116; see the arrow D4 in FIG. 9).

After proceeding to step 117, the processing returns to step 101, in which the current operation position of the travel operation lever 36a is detected.

When the travel operation lever 36a is switched from the operation position N to the operation position R (determined YES in step 102; time td4 in FIG. 9), it is determined whether or not the vehicle body speed is greater than the predetermined threshold value (step 121; see the arrow D5 in FIG. 9). Since the vehicle body speed is greater than the predetermined threshold value when the switching operation of the travel operation lever 36a is performed, the FR speed change flag is kept ON (step 122; see the arrow D6 in FIG. 9).

After proceeding to step 117, the processing returns to step 101, in which the current operation position of the travel operation lever 36a is detected.

Since the travel operation lever 36a has been switched to the reverse travel direction position R, it is determined NO in step 102, and the processing proceeds to the next step 103 in which it is determined whether or not the clutch after the switching is in the normal running state, that is, whether or not the reverse clutch 19 corresponding to the travel direction position R after the switching has reached the holding pressure (step 103).

The reverse clutch 19 has not yet reached holding pressure immediately after the switching (determined NO in step 103). Therefore, it is then determined whether or not the vehicle body speed is smaller than the predetermined threshold value (step 104). Since the vehicle body speed is equal to or greater than the predetermined threshold value, the zero cross flag is kept OFF (determined NO in step 104; see the arrow D7 in FIG. 9). Subsequently, it is determined whether or not the clutch after the switching has exceeded the build up waiting time limit (step 105). The reverse clutch 19 after the switching has not yet exceeded the build up waiting time limit immediately after the switching (determined NO in step 105). Therefore, it is determined that the FR interlocking brake deactivation condition (d) is not satisfied, and it is then determined whether or not the FR interlocking brake activation conditions (a) and (b) are satisfied simultaneously (steps 106, 107, 108).

Specifically, it is first determined whether or not the FR speed change flag is ON (step 106). Since the FR speed change flag is ON (determined YES in step 106), it is then determined whether or not the travel direction position of the travel operation lever 36a after the switching and the travel direction position indicated by the travel direction flag are opposite to each other (steps 107 and 108). The travel direction position after the switching is the reverse travel direction position R, while the travel direction flag indicates the forward travel direction position F opposite thereto (determined YES in step 108; see the arrow D8 in FIG. 9). Accordingly, it is determined that the FR interlocking brake activation conditions (a) and (b) are satisfied simultaneously. Further, it is determined whether or not the FR interlocking brake deactivation condition is satisfied, that is, whether or not the zero cross flag is ON (step 109). The zero cross flag is OFF and the FR interlocking brake deactivation condition is not satisfied. Therefore, it is determined that the FR interlocking brake is to be activated (determined NO in step 109). Accordingly, a current command for activating the brake device 8 is output to the ECMV 35 used for the brake device 8 (steps 110 to 116; see the arrow D9 in FIG. 9).

After that, the FR interlocking brake is activated in the same manner as at time ta2 to ta4 in FIG. 6. A brake force corresponding to the first brake pressure Pb is generated by the brake device 8, and subsequently a brake force corresponding to the second brake pressure Pc is generated (step 115; time td4 to td5 in part (h) of FIG. 9).

After proceeding to step 117, the processing returns to step 101, in which the current operation position of the travel operation lever 36a is detected.

Since the travel operation lever 36a has been switched to the reverse travel direction position R, it is determined NO in step 102, and the processing proceeds to the next step 103 in which it is determined whether or not the clutch after the switching is in the normal running state, that is, whether or not the reverse clutch 19 corresponding to the travel direction position R after the switching has reached the holding pressure (step 103).

Since the reverse clutch 19 has not reached the holding pressure (determined NO in step 103), it is then determined whether or not the vehicle body speed is smaller than the predetermined threshold value (step 104). Since the FR interlocking brake has already been activated, the vehicle body speed has been reduced and thus the vehicle body speed is smaller than the predetermined threshold value (determined YES in step 104). Accordingly, the zero cross flag indicates ON (step 125; see the arrow D10 in FIG. 9). The FR interlocking brake deactivation condition is satisfied by the zero cross flag being turned ON, and the FR interlocking brake is set to the holding pressure (step 113). As a result, the brake force generated by the brake device 8 is null unless the foot brake is activated (steps 115 and 116; see the arrow D11 in FIG. 9).

After proceeding to step 117, the processing returns to step 101, in which the current operation position of the travel operation lever 36a is detected.

Since the travel operation lever 36a has been switched to the reverse travel direction position R, it is determined NO in step 102 and the processing proceeds to the next step 103 in which it is determined whether or not the clutch after the switching is in the normal running state, that is, whether or not the reverse clutch 19 corresponding to the travel direction position R after the switching has reached the holding pressure (step 103).

When the reverse clutch 19 reaches the holding pressure (normal running state) (determined YES in step 103; time td6 in part (e) of FIG. 9), the FR speed change flag is turned OFF (step 118; see the arrow D12 in FIG. 9), the travel direction flag is updated to the current operation position, or the reverse travel direction position R (step 119; see the arrow D13 in FIG. 9), and the zero cross flag is turned OFF (step 120; see the arrow D14 in FIG. 9).

After proceeding to step 117, the processing returns to step 101, in which the current operation position of the travel operation lever 36a is detected.

According to the fourth exemplary embodiment as described above, the FR interlocking brake is once activated when the travel operation lever 36a is switched in the sequence of F→N→R, but the FR interlocking brake is deactivated when the travel operation lever 36a is then returned to the neutral position N. After that, when the travel operation lever 36a is operated to switch from N to R, the FR interlocking brake is activated.

In this manner, the brake can be prevented from being activated unnecessarily and continuously during the switching operation, and the brake is activated only after the switching to the reverse travel position R is established. Accordingly, uncomfortable operation feeling given to the operator is eliminated and the working efficiency is improved. In addition, the thermal load on the clutch and the transmission shock can be reduced.

Fifth Exemplary Embodiment

FIG. 10

Figure 10:
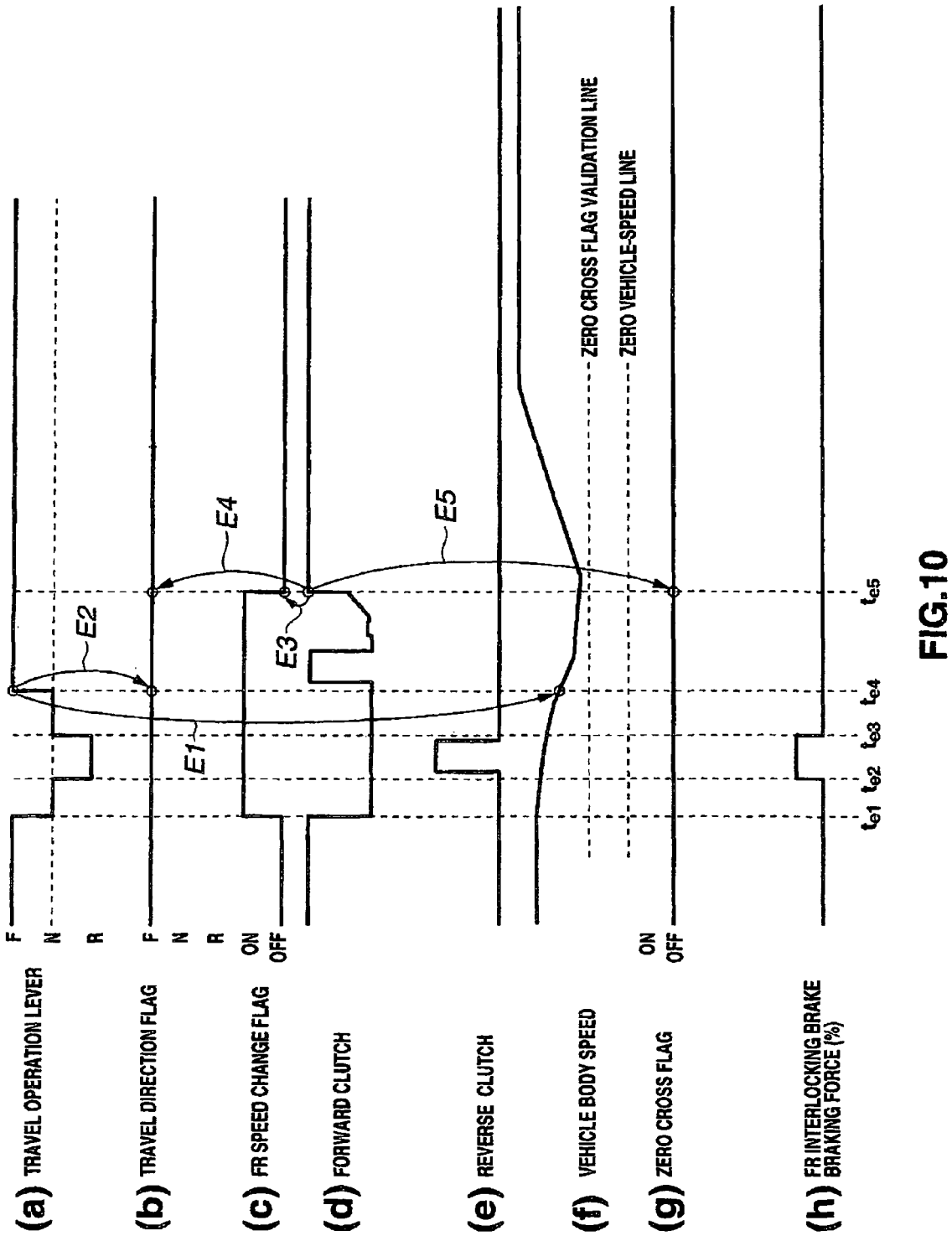
FIG. 10 consisted of parts (a) to (h) is a time chart according to the fifth exemplary embodiment.

FIG. 10 is a time chart illustrating a case in which the switching operation of the travel operation lever 36a is performed in the sequence of "F→N→R→N→F".

Parts (a) to (h) of FIG. 10 correspond to parts (a) to (h) of FIG. 6, respectively.

Description will be made with reference to FIG. 4 and FIG. 10 together.

Operations at time te1 to time te4 in FIG. 10 are the same as those at time td1 to time td4 according to the fourth exemplary embodiment (FIG. 9). Specifically, like the fourth exemplary embodiment, the FR interlocking brake is once activated when the travel operation lever 36a is switched in the sequence of F→N→R, but the FR interlocking brake is deactivated when the travel operation lever 36a is then returned to the neutral position N. Particular description which may overlap with the fourth exemplary embodiment will be omitted.

When the travel operation lever 36a is switched from the operation position N to the operation position F at time te4 (determined YES in step 102; time te4 in FIG. 10), it is determined whether or not the vehicle body speed is greater than a predetermined threshold value (step 121; see the arrow E1 in FIG. 10). The vehicle speed is high, and the vehicle body speed has become greater than the predetermined threshold value when the switching operation of the travel operation lever 36a is performed (determined YES in step 121). Therefore, the FR speed change flag is kept ON (step 122).

After proceeding to step 117, the processing returns to step 101, in which the current operation position of the travel operation lever 36a is detected.

Since the travel operation lever 36a has been switched to the forward travel direction position F, it is determined NO in step 102, and the processing proceeds to the next step 103 in which it is determined whether or not the clutch is in the normal running state (step 103).

Since the forward clutch 17 after the switching has not reached the holding pressure (determined NO in step 103), it is then determined whether or not the vehicle body speed is smaller than the predetermined threshold value (step 104). Since the vehicle body speed is high, the vehicle body speed is equal to or greater than the predetermined threshold value (determined NO in step 104). Subsequently, it is determined whether or not the forward clutch 17 and the reverse clutch 19 have reached the build up waiting time limit (step 105). The forward clutch 17 has not reached the build up waiting time limit (determined NO in step 105). Therefore, it is determined that the FR interlocking brake deactivation condition (d) is not satisfied, and it is then determined whether or not the FR interlocking brake activation conditions (a) and (b) are satisfied simultaneously (steps 106, 107 and 108).

Specifically, it is first determined whether or not the FR speed change flag is ON (step 106). Since the FR speed change flag is ON (determined YES in step 106), it is then determined whether or not the travel direction position after the switching of the travel operation lever 36a and the travel direction position indicated by the travel direction flag are opposite to each other (steps 107 and 108). The travel direction position after the switching is the forward travel direction position F, while the travel direction flag indicates the same position, namely, the forward travel direction position F, and thus they are not opposite travel direction positions (determined NO in step 107, and determined NO in step 108; see the arrow E2 in FIG. 10). Therefore, it is determined that the FR interlocking brake activation conditions (a) and (b) are not satisfied simultaneously, and the processing proceeds to step 113. The processing thus goes on to step 117 with the FR interlocking brake being kept in the inactivated state.

After proceeding to step 117, the processing returns to step 101, in which the current operation position of the travel operation lever 36a is detected.

Since the travel operation lever 36a has been switched to the forward travel direction position F, it is determined NO in step 102, and the processing proceeds to the next step 103 in which it is determined whether or not the clutch after the switching is in the normal running state, that is, whether or not the forward clutch 17 corresponding to the travel direction position F after the switching has reached the holding pressure (step 103).

When the forward clutch 17 reaches the holding pressure (normal running state) (determined YES in step 103; time te5 in part (d) of FIG. 10), the FR speed change flag becomes OFF (step 118; see the arrow E3 in FIG. 10), the travel direction flag continues to indicate the forward travel direction position F as the current operation position (step 119; see the arrow E4 in FIG. 10), and the zero cross flag is kept OFF (step 120; see the arrow E5 in FIG. 10).

After proceeding to step 117, the processing returns to step 101, in which the current operation position of the travel operation lever 36a is detected.

According to the fifth exemplary embodiment as described above, the FR interlocking brake is once activated when the travel operation lever 36a is switched in the sequence of F→N→R, but the FR interlocking brake is deactivated when the travel operation lever 36a is then returned to the neutral position N. When the travel operation lever 36a is then switched from N to F, the FR interlocking brake is kept in the deactivated state. Accordingly, the operation is enabled exactly according to the operator's intention to allow the vehicle body to continue traveling forward without activating the brake. This eliminates an uncomfortable operation feeling caused by unnecessary activation of the brake, and improves the working efficiency.

According to the exemplary embodiments as described above, it is discriminated whether the current travel direction of the vehicle body is the forward travel direction F or the reverse travel direction R based on the selected operation position of the travel operation lever 36a, the clutch oil pressure in the forward clutch 17 or the reverse clutch, and the detected vehicle body speed (travel direction flag).

Figure 4:
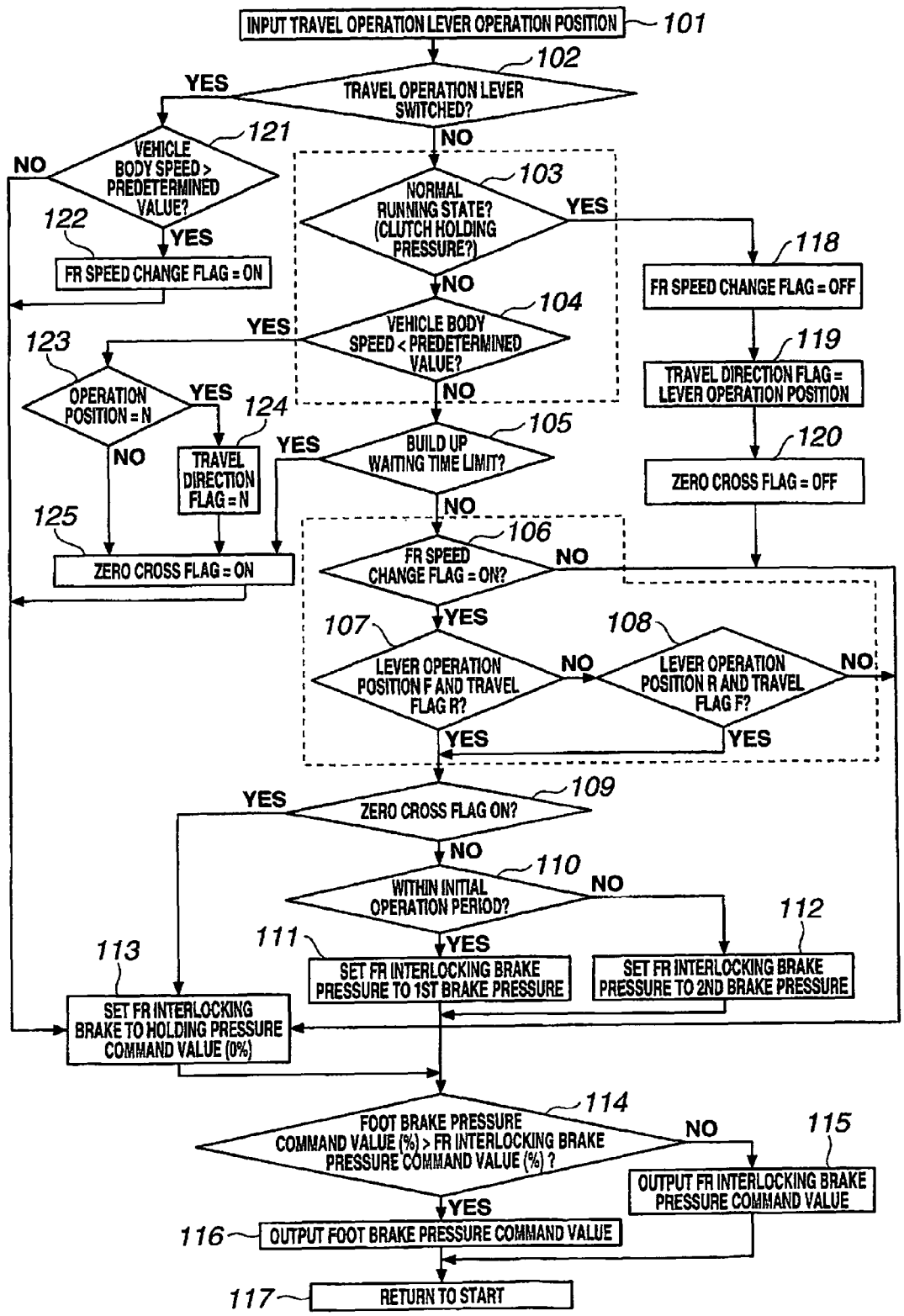
FIG. 4 is a flowchart showing processing steps according to an embodiment.

The brake force of the brake device 8 is controlled such that the brake device 8 is activated on the conditions (FR interlocking brake activation conditions (a) and (b)) that the travel direction position (R, for example) selected by the travel operation lever 36a and the travel direction (F, for example) discriminated by the travel direction flag are opposite to each other and at the same time the detected vehicle body speed is equal to or greater than the predetermined threshold value (FR speed change flag ON) when the selected operation position of the travel operation lever 36a is switched (determined YES in step 106, and determined YES in either step 107 or 108 of FIG. 4) (step 115).

Further, the brake force of the brake device 8 is controlled such that the brake device 8 is deactivated on the condition (FR interlocking brake deactivation condition (c), zero cross flag ON) that the detected vehicle body speed is equal to or smaller than the predetermined threshold value when the selected operation position of the travel operation lever 36a is switched (determined YES in step 104 of FIG. 4) (step 125, step 113).

Accordingly, even if performed is an operation whose final operation position is uncertain, such as a shuttle operation in which the travel operation lever 36a is frequently switched between F and R, control is performed to prevent the unnecessary activation of the brake until the final operation position is established. Further, once the final operation position is established, control is performed to activate the brake on the condition that the final operation position is opposite to the actual travel direction. If the final operation position is the same as the one before the start of the operation, control is performed not to activate the brake. This eliminates uncomfortable operation feeling given to the operator and improves the working efficiency. Further, the thermal load on the clutch and the transmission shock can be reduced.

The description of the exemplary embodiments above has been made on the assumption that the rotational speed sensor 27 is formed by an electromagnetic pickup and an absolute value of the rotational speed of the transmission output shaft is detected.

However, the present invention is not limited to this and may be embodied such that not only the absolute value of the rotational speed but also the rotational direction is detected by a sensor. For example, a rotational direction may be detected (measured) by using a photo coupler or a magnetic sensor to detect signals with different phases (phase A and phase B) and comparing the detected values between the phase A and the phase B.

The signals with the phase A and phase B can be input from the photo coupler or magnetic sensor into the controller 15 to allow the controller 15 to compute the vehicle body speed and the travel direction of the vehicle body. In this case, the travel direction flag and the FR speed change flag are not necessary.

Figure 5:
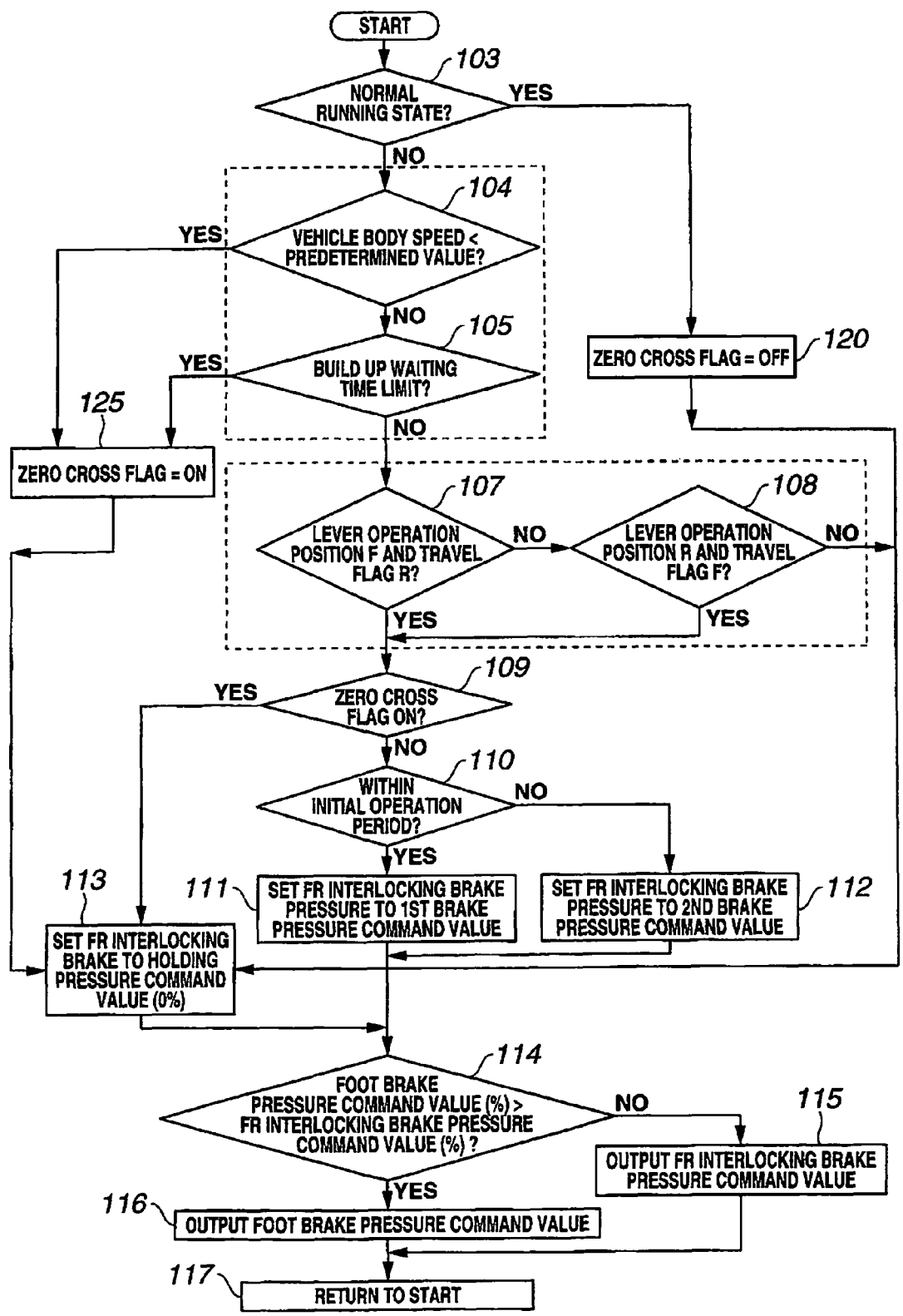
FIG. 5 is a flowchart showing processing steps according to an embodiment.

FIG. 5 is a flowchart illustrating a case in which a rotational speed sensor 27 capable of detecting rotational speeds and rotational directions is provided, so that the vehicle body speed and the vehicle body travel direction are computed by the controller 15 based on detected values by this sensor. In FIG. 5, like steps as those in FIG. 4 are assigned with the same reference numerals.

As seen by comparing FIG. 5 with FIG. 4, steps 101, 102, 106, 118, 119, and 121 to 124 relating to the travel direction flag and the FR speed change flag are omitted in FIG. 5.

Specifically, the brake force of the brake device 8 is controlled to activate the brake device 8, in the same manner as in FIG. 4, on the condition that the travel direction position selected by the travel operation lever 36a (R, for example) is opposite to the travel direction computed by the controller 15 (F, for example) (determined YES in step 108), and the vehicle body speed computed by the controller 15 is equal to or greater than the predetermined threshold value (determined NO in step 104) (step 115).

Further, the brake force of the brake device 8 is controlled to deactivate the brake device 8 on the condition that the vehicle body speed computed by the controller 15 is equal to or smaller than the predetermined threshold value (determined YES in step 104, step 125; zero cross flag ON) (step 113).

Accordingly, when the travel operation lever 36a is operated as shown in part (a) of FIG. 6 to part (a) of FIG. 10, the FR interlocking brake is activated (deactivated) in accordance therewith as shown in part (h) of FIG. 6, part (h) of FIG. 7, part (i) of FIG. 8, part (h) of FIG. 9, and part (h) of FIG. 10.

INDUSTRIAL APPLICABILITY

The present invention is applicable as a brake controller in work vehicles, earthmoving vehicles, agricultural vehicles, and so on.

What is claimed is:

1. A work vehicle controller for a work vehicle having a forward clutch and a reverse clutch, the forward clutch terminating a clutching function thereof when a clutch oil pressure of the forward clutch reaches a holding pressure, and the reverse clutch terminating a clutching function thereof when a clutch oil pressure of the reverse clutch reaches a holding pressure, the work vehicle performing a shuttle operation and being configured such that an engine power is transmitted to a drive wheel via the forward clutch or the reverse clutch, the controller comprising:

an operation unit operated to select a travel direction position from among a forward travel direction position, a neutral position, and a reverse travel direction position;

a brake that reduces a vehicle body speed of the work vehicle;

a vehicle body speed detector that detects the vehicle body speed;

a forward/reverse clutch controller that controls the clutch oil pressure to disconnect the reverse clutch while connecting the forward clutch when the forward travel direction position is selected by the operation unit, and controls the clutch oil pressure to disconnect the forward clutch while connecting the reverse clutch when the reverse travel direction position is selected by the operation unit;

a travel direction determination unit that determines whether a current travel direction of a vehicle body of the work vehicle is the forward travel direction or the reverse travel direction based on whether the clutch oil pressure of the forward clutch reaches the holding pressure thereof or the reverse clutch reaches the holding pressure thereof after switching the travel direction position of the operation unit;

a braking force controller that controls a braking force of the brake such that the brake is activated when the travel position direction of the operation unit is switched if the travel direction position selected by the operation unit and the travel direction determined by the travel direction determination unit are opposite to each other and the detected vehicle body speed is greater than a predetermined threshold value.

2. The work vehicle controller according to claim 1, wherein the braking force controller controls the braking force of the brake such that the brake is deactivated on a condition that the detected vehicle body speed is equal to or smaller than the predetermined threshold value when the travel direction position selected by the operation unit is switched.

3. A work vehicle controller for a work vehicle having a forward clutch and a reverse clutch, the forward clutch terminating a clutching function thereof when a clutch oil pressure of the forward clutch reaches a holding pressure, and the reverse clutch terminating a clutching function thereof when a clutch oil pressure of the reverse clutch reaches a holding pressure, the work vehicle performing a shuttle operation and being configured such that an engine power is transmitted to a drive wheel via the forward clutch or the reverse clutch, the controller comprising:

an operation unit that is operated to select a travel direction position from among a forward travel direction position, a neutral position, and a reverse travel direction position;

a brake that reduces a vehicle body speed of the work vehicle;

a vehicle body speed/travel direction detector that detects the vehicle body speed and detects whether a current travel direction of a vehicle body of the work vehicle is the forward travel direction or the reverse travel direction based on whether the clutch oil pressure of the forward clutch reaches the holding pressure thereof or the reverse clutch reaches the holding pressure thereof after switching the travel direction position of the operation unit;

a forward/reverse clutch controller that controls the clutch oil pressure to disconnect the reverse clutch while connecting the forward clutch when the forward travel direction position is selected by the operation unit, and controls the clutch oil pressure to disconnect the forward clutch while connecting the reverse clutch when the reverse travel direction position is selected by the operation unit; and a braking force controller that controls a braking force of the brake such that the brake is activated when the travel direction position selected by the operation unit and the travel direction detected by the vehicle body speed/travel direction detector are opposite to each other and the detected vehicle body speed is greater than a predetermined threshold value.

4. The work vehicle controller according to claim 3, wherein the braking force controller controls the braking force of the brake such that the brake is deactivated on a condition that the detected vehicle body speed is equal to or smaller than the predetermined threshold value when the travel direction position selected by the operation unit is switched.

* * * * *